US011218715B2

(12) United States Patent
Wang et al.

(10) Patent No.: US 11,218,715 B2
(45) Date of Patent: Jan. 4, 2022

(54) METHODS AND APPARATUS FOR SPATIAL GROUPING AND COORDINATE SIGNALING FOR IMMERSIVE MEDIA DATA TRACKS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/898,138

(22) Filed: Jun. 10, 2020

(65) Prior Publication Data
US 2020/0396471 A1    Dec. 17, 2020

Related U.S. Application Data

(60) Provisional application No. 62/870,716, filed on Jul. 4, 2019, provisional application No. 62/861,372, filed on Jun. 14, 2019.

(51) Int. Cl.
| | |
|---|---|
| *H04N 19/44* | (2014.01) |
| *G06T 9/00* | (2006.01) |
| *G06T 3/00* | (2006.01) |
| *H04N 19/70* | (2014.01) |

(52) U.S. Cl.
CPC ........... *H04N 19/44* (2014.11); *G06T 3/0087* (2013.01); *G06T 9/00* (2013.01); *H04N 19/70* (2014.11)

(58) Field of Classification Search
None
See application file for complete search history.

(56) References Cited

U.S. PATENT DOCUMENTS

| | | | |
|---|---|---|---|
| 2020/0153885 A1* | 5/2020 | Lee | G06T 9/001 |
| 2020/0302632 A1* | 9/2020 | Oh | G06T 7/187 |

* cited by examiner

*Primary Examiner* — Lindsay J Uhl
(74) *Attorney, Agent, or Firm* — Wolf, Greenfield & Sacks, P.C.

(57) ABSTRACT

The techniques described herein relate to methods, apparatus, and computer readable media configured to encode and/or decode video data. Immersive media data includes a first patch track comprising first encoded immersive media data that corresponds to a first spatial portion of immersive media content, a second patch track comprising second encoded immersive media data that corresponds to a second spatial portion of the immersive media content that is different than the first spatial portion, an elementary data track comprising first immersive media elementary data, wherein the first patch track and/or the second patch track reference the elementary data track, and grouping data that specifies a spatial relationship between the first patch track and the second patch track in the immersive media content. An encoding and/or decoding operation is performed based on the first patch track, the second patch track, the elementary data track and the grouping data to generate decoded immersive media data.

18 Claims, 18 Drawing Sheets

| | Descriptor |
|---|---|
| spc_6dof_coordinate_set( ) { | |
|   spc_flag | u(1) |
|   if( spc_flag ) { | |
|     spc_position_x | i(16) |
|     spc_position_y | i(16) |
|     spc_position_z | i(16) |
|     spc_rotation_flag | u(1) |
|     if( spc_rotation_flag ) { | |
|       spc_rotation_yaw | u(16) |
|       spc_rotation_pitch | u(16) |
|       spc_rotation_roll | u(16) |
|     } | |
|     spc_size_width | u(16) |
|     spc_size_height | u(16) |
|     spc_size_depth | u(16) |
|   } | |
| } | |

FIG. 16

METHODS AND APPARATUS FOR SPATIAL GROUPING AND COORDINATE SIGNALING FOR IMMERSIVE MEDIA DATA TRACKS

RELATED APPLICATIONS

This Application claims priority under 35 U.S.C. § 119(e) to U.S. Provisional Application Ser. No. 62/861,372, titled "METHODS OF SPATIAL GROUPING OF V-PCC PATCH TRACKS OF TILED V-PCC CONTENT IN ISOBMFF," filed on Jun. 14, 2019 and U.S. Provisional Application Ser. No. 62/870,716, titled "METHODS OF SIGNALING 6DOF COORDINATES OF V-PCC SUB-POINT CLOUDS IN V-PCC BIT STREAMS," filed on Jul. 4, 2019, which are herein incorporated by reference in their entirety.

TECHNICAL FIELD

The techniques described herein relate generally to video coding, and particularly to methods and apparatus for spatial grouping and coordinate signaling for immersive media tracks (e.g., point cloud multimedia, 3D immersive media, and/or the like), including spatial grouping of tiled point cloud content, signaling six degrees of freedom (6DoF) coordinates of sub-point clouds, and the like.

BACKGROUND OF INVENTION

Various types of video content, such as 2D content, 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangle projection can be used to put the spherical map into a two-dimensional image. This can be done, for example, to use two-dimensional encoding and compression techniques. Ultimately, the encoded and compressed content is stored and delivered using a desired delivery mechanism (e.g., thumb drive, digital video disk (DVD) and/or online streaming). Such video can be used for virtual reality (VR), and/or 3D video.

At the client side, when the client processes the content, a video decoder decodes the encoded video and performs a reverse-projection to put the content back onto the sphere. A user can then view the rendered content, such as using a head-worn viewing device. The content is often rendered according to the user's viewport, which represents the angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder does not know what the user will actually view, then the whole encoding and decoding process will process the entire spherical content. This can allow, for example, the user to view the content at any particular viewport and/or area, since all of the spherical content is delivered and decoded.

However, processing all of the spherical content can be compute intensive and can consume significant bandwidth. For example, for online streaming applications, processing all of the spherical content can place a large burden on network bandwidth. Therefore, it can be difficult to preserve a user's experience when bandwidth resources and/or compute resources are limited. Some techniques only process the content being viewed by the user. For example, if the user is viewing the front (e.g., or north pole), then there is no need to deliver the back part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for processing (e.g., encoding or decoding) point cloud video data and/or other 3D immersive media in an immersive media data structure that includes separate patch tracks that are used to encode different portions of the point cloud content. In some embodiments, the point cloud video data includes 2D and/or 3D point cloud data. The point cloud video data can be partitioned into 2D and/or 3D regions, and be encoded into groups of corresponding 2D tracks and/or 3D tracks within the immersive media data structure. According to some embodiments, the patch tracks can share one or more common elementary data tracks (e.g., including one or more geometry, attribute, and/or occupancy tracks). The techniques provide for encoding the patch tracks with grouping information to indicate spatial relations among the various tracks for the point cloud content. According to some embodiments, the techniques can provide techniques for flexibly viewing the immersive media content, including providing rotational control of the point cloud content (both globally and/or at a patch level of granularity).

Some embodiments relate to a decoding method for decoding video data for immersive media. The method includes accessing immersive media data including a first patch track including first encoded immersive media data, wherein the first encoded immersive media data corresponds to a first spatial portion of immersive media content; a second patch track including second encoded immersive media data, wherein the second encoded immersive media data corresponds to a second spatial portion of the immersive media content that is different than the first spatial portion; an elementary data track including first immersive media elementary data, wherein the first patch track, the second patch track, or both, reference the elementary data track; and grouping data that specifies a spatial relationship between the first patch track and the second patch track in the immersive media content. The method also includes performing a decoding operation based on the first patch track, the second patch track, the elementary data track and the grouping data to generate decoded immersive media data.

In some examples, the first patch track includes a first associated portion of the grouping data indicating the first patch track is part of one or more groups of patch tracks; and the second patch track includes a second associated portion of the grouping data indicating the second patch track is part of the one or more groups of patch tracks.

In some examples, the one or more groups of patch tracks includes a plurality of groups of patch tracks, including at least: a first group of patch tracks corresponding to a third spatial portion of immersive media content that includes the first spatial portion of immersive media content of the first patch track and the second spatial portion of immersive media content of the second patch track; a second group of patch tracks corresponding to a fourth spatial portion of immersive media content, wherein: the first group of patch tracks contains the second group of patch tracks; and the third spatial portion of immersive media content contains the fourth spatial portion of immersive media content.

In some examples, the immersive media content includes point cloud multimedia.

In some examples, the elementary data track includes: at least one geometry track including geometry data of the immersive media; at least one attribute track including attribute data of the immersive media; and an occupancy track including occupancy map data of the immersive media; accessing the immersive media data comprises accessing: the geometry data in the at least one geometry track; the attribute data in the at least one attribute track; and the occupancy map data of the occupancy track; and performing the decoding operation includes performing the decoding operation using the geometry data, the attribute data, and the occupancy map data, to generate the decoded immersive media data.

In some examples, the first encoded immersive media data and the second encoded immersive media data include encoded two-dimensional (2D) data.

In some examples, the first encoded immersive media data and the second encoded immersive media data include encoded three-dimensional (3D) data.

In some examples, the immersive media data further includes data that specifies a spatial orientation of the encoded 3D data, the data including: a position including x, y, z coordinates for the encoded 3D data; a width of the encoded 3D sub-volumetric data; a height of the encoded 3D sub-volumetric data; and a depth of the encoded 3D sub-volumetric data.

In some examples, the data specifying the spatial orientation of the encoded 3D data further includes data indicative of a rotation of the encoded 3D data with respect to a common reference coordinate system.

In some examples, wherein the rotation data includes data indicative of a yaw, a pitch and a roll.

Some embodiments relate to a method for encoding video data for immersive media. The method includes encoding immersive media data including encoding at least: a first patch track including first immersive media data, wherein the first immersive media data corresponds to a first spatial portion of immersive media content; a second patch track including second immersive media data, wherein the second immersive media data corresponds to a second spatial portion of the immersive media content that is different than the first spatial portion; an elementary data track including first immersive media elementary data, wherein the first patch track, the second patch track, or both, reference the elementary data track; and grouping data that specifies a spatial relationship between the first patch track and the second patch track in the immersive media content.

Some embodiments relate to an apparatus configured to decode video data. The apparatus includes a processor in communication with memory. The processor is configured to execute instructions stored in the memory that cause the processor to perform accessing immersive media data including at least: a first patch track including first encoded immersive media data, wherein the first encoded immersive media data corresponds to a first spatial portion of immersive media content; a second patch track including second encoded immersive media data, wherein the second encoded immersive media data corresponds to a second spatial portion of the immersive media content that is different than the first spatial portion; an elementary data track including first immersive media elementary data, wherein the first patch track, the second patch track, or both, reference the elementary data track; and grouping data that specifies a spatial relationship between the first patch track and the second patch track in the immersive media content. The processor is also configured to perform a decoding operation based on the first patch track, the second patch track, the elementary data track and the grouping data to generate decoded immersive media data.

In some examples, the first patch track includes a first associated portion of the grouping data indicating the first patch track is part of one or more groups of patch tracks; and the second patch track includes a second associated portion of the grouping data indicating the second patch track is part of the one or more groups of patch tracks.

In some examples, the one or more groups of patch tracks includes a plurality of groups of patch tracks, including at least: a first group of patch tracks corresponding to a third spatial portion of immersive media content that includes the first spatial portion of immersive media content of the first patch track and the second spatial portion of immersive media content of the second patch track; a second group of patch tracks corresponding to a fourth spatial portion of immersive media content, wherein: the first group of patch tracks contains the second group of patch tracks; and the third spatial portion of immersive media content contains the fourth spatial portion of immersive media content.

In some examples, immersive media content includes point cloud multimedia.

In some examples, the elementary data track includes: at least one geometry track including geometry data of the immersive media; at least one attribute track including attribute data of the immersive media; and an occupancy track including occupancy map data of the immersive media; accessing the immersive media data includes accessing: the geometry data in the at least one geometry track; the attribute data in the at least one attribute track; and the occupancy map data of the occupancy track; and performing the decoding operation includes performing the decoding operation using the geometry data, the attribute data, and the occupancy map data, to generate the decoded immersive media data.

In some examples, the first encoded immersive media data and the second encoded immersive media data include encoded three-dimensional (3D) data.

In some examples, immersive media data further includes data that specifies a spatial orientation of the encoded 3D data, the data including: a position including x, y, z coordinates for the encoded 3D data; a width of the encoded 3D sub-volumetric data; a height of the encoded 3D sub-volumetric data; and a depth of the encoded 3D sub-volumetric data.

In some examples, the data specifying the spatial orientation of the encoded 3D data further includes data indicative of a rotation of the encoded 3D data with respect to a common reference coordinate system.

In some examples, the rotation data includes data indicative of a yaw, a pitch and a roll.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 16 shows exemplary syntax of a V-PCC sub-point-cloud 6DoF coordinate, according to some embodiments.

DETAILED DESCRIPTION OF INVENTION

Figure 1:
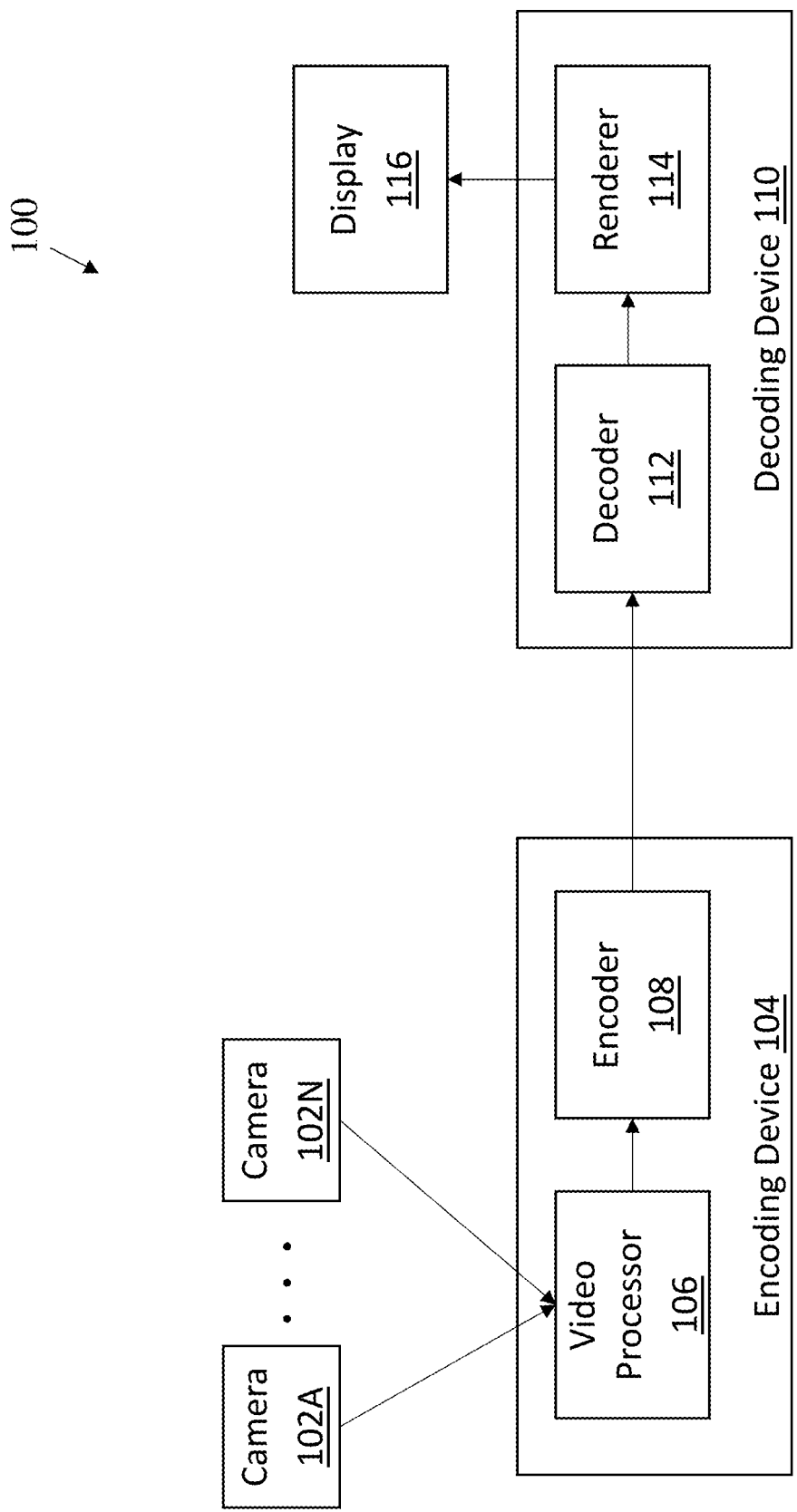
FIG. 1 shows an exemplary video coding configuration, according to some embodiments.

Point cloud data or other immersive media, such as Video-based Point Cloud Compression (V-PCC), data can provide compressed point cloud data for various types of 3D multimedia applications. Conventional storage structures for point cloud content present the point cloud content (e.g., V-PCC component tracks) as a timer-series sequence of units (e.g., V-PCC units) that encode the entire immersive media content of the associated immersive media data, and also include a collection of component data tracks (e.g., geometry, texture, and/or occupancy tracks). Such conventional techniques do not provide for subdividing the point cloud content into smaller portions that are carried by individual units in the storage structures. The inventors have appreciated that it is desirable to provide techniques for encoding and/or decoding point cloud video data using separate patch tracks that each encode an associated different portion of the point cloud content. The techniques described herein provide for a new point cloud content structure that leverages separate patch tracks to break up and encode the original immersive media content (e.g., which can include 2D and/or 3D point cloud content) such that multiple patch tracks can be included in the immersive media structure and can share one or more common elementary data tracks (e.g., including one or more geometry, attribute, and/or occupancy tracks). The techniques further provide for encoding the patch tracks such that each patch track includes one or more grouping structures to indicate which group(s) of tracks the patch track is associated to form larger spatial portions with in the storage structure. The grouping information can be used by the decoder to determine how to decode the patch tracks, including determining which patch tracks correspond to which spatial portion of the immersive media content. The techniques can be used to improve viewport-dependent point cloud media processing, such that only relevant patch track(s) need to be processed depending on a user's viewport and its dynamic movement in time. For example, if a user is only viewing a portion of the immersive media content, only the patch track(s) associated with that content and any anticipated movement of the portion in space over time can be transmitted to the user's device for decoding and processing. Since prior point cloud content structures encoded the entire point cloud content, such structures did not allow for viewport-based processing of the immersive media content at the track level.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
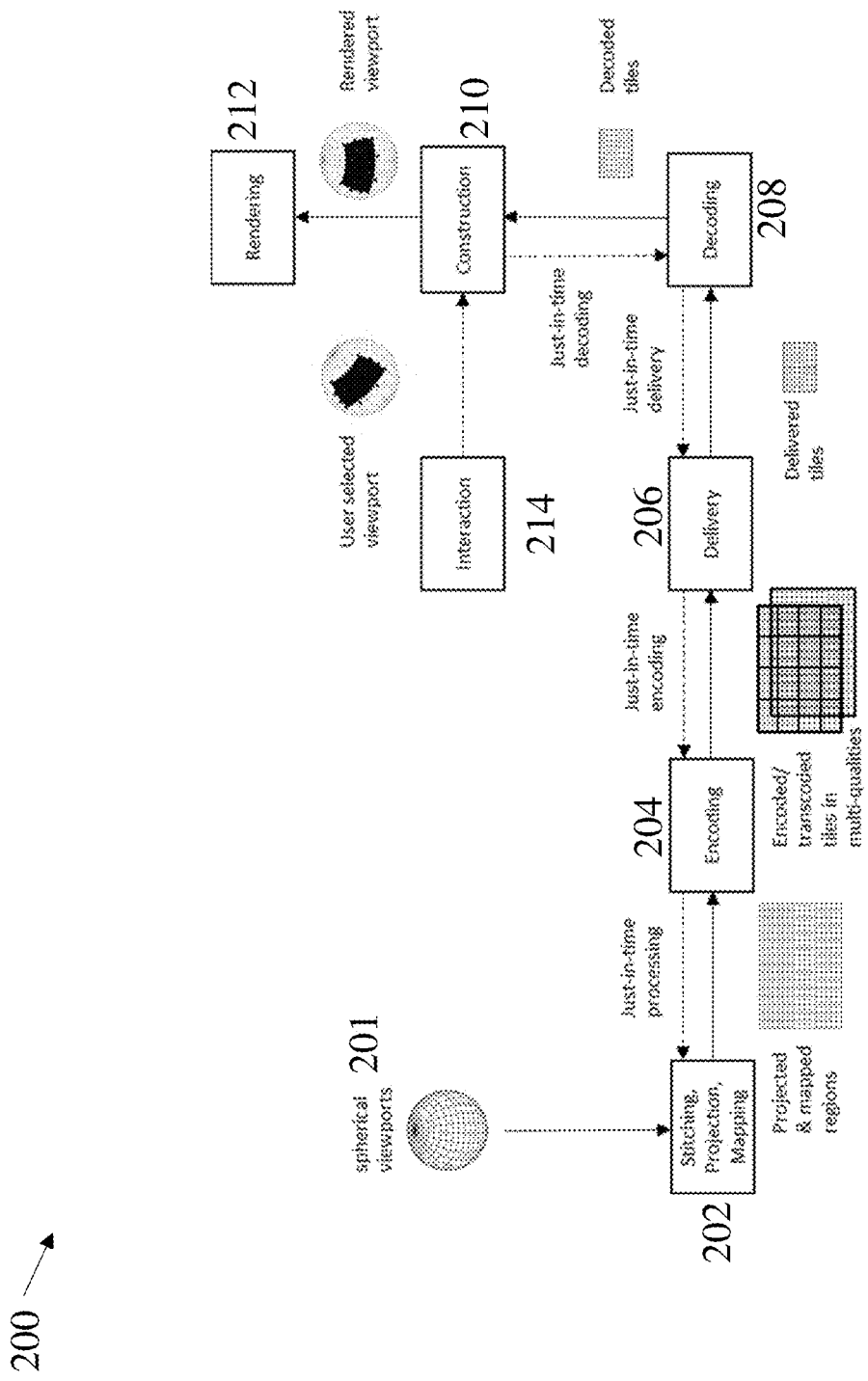
FIG. 2 shows a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

A region of interest (ROI) is somewhat similar in concept to viewport. An ROI may, for example, represent a region in 3D or 2D encodings of omnidirectional video. An ROI can have different shapes (e.g., a square, or a circle), which can be specified in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared. In such implementations, a region of interest typically has a separate video track that carries the ROI content. Thus, the encoded video specifies the ROI, and how the ROI video is associated with the underlying video. The techniques described herein are described in terms of a region, which can include a viewport, a ROI, and/or other areas of interest in video content.

ROI or viewport tracks can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191, also ISO/IEC 23001-10:2015), which is hereby incorporated by reference herein in its entirety, describes an ISO Base Media File Format (ISOBMFF) file format that uses a timed metadata track to signal that a main 2D video track has a 2D ROI track. As another example, Dynamic Adaptive Streaming over HTTP (DASH) includes a spatial relationship descriptor to signal the spatial relationship between a main 2D video representation and its associated 2D ROI video representations. ISO/IEC 23009-1, draft third edition (w10225), Jul. 29, 2016, addresses DASH, and is hereby incorporated by reference herein in its entirety. As a further example, the Omnidirectional MediA Format (OMAF) is specified in ISO/IEC 23090-2, which is hereby incorporated by reference herein in its entirety. OMAF specifies the omnidirectional media format for coding, storage, delivery, and rendering of omnidirectional media. OMAF specifies a coordinate system, such that the user's viewing perspective is from the center of a sphere looking outward towards the inside surface of the sphere. OMAF includes extensions to ISOBMFF for omnidirectional media as well as for timed metadata for sphere regions.

When signaling an ROI, various information may be generated, including information related to characteristics of the ROI (e.g., identification, type (e.g., location, shape, size), purpose, quality, rating, etc.). Information may be generated to associate content with an ROI, including with the visual (3D) spherical content, and/or the projected and mapped (2D) frame of the spherical content. An ROI can be characterized by a number of attributes, such as its identification, location within the content it is associated with, and its shape and size (e.g., in relation to the spherical and/or 3D content). Additional attributes like quality and rate ranking of the region can also be added, as discussed further herein.

Point cloud data can include a set of 3D points in a scene. Each point can be specified based on an (x, y, z) position and color information, such as (R,V,B), (Y,U,V), reflectance, transparency, and/or the like. The point cloud points are typically not ordered, and typically do not include relations with other points (e.g., such that each point is specified without reference to other points). Point cloud data can be useful for many applications, such as 3D immersive media experiences that provide 6DoF. However, point cloud information can consume a significant amount of data, which in turn can consume a significant amount of bandwidth if being transferred between devices over network connections. For example, 800,000 points in a scene can consume 1 Gbps, if uncompressed. Therefore, compression is typically needed in order to make point cloud data useful for network-based applications.

Figure 3:
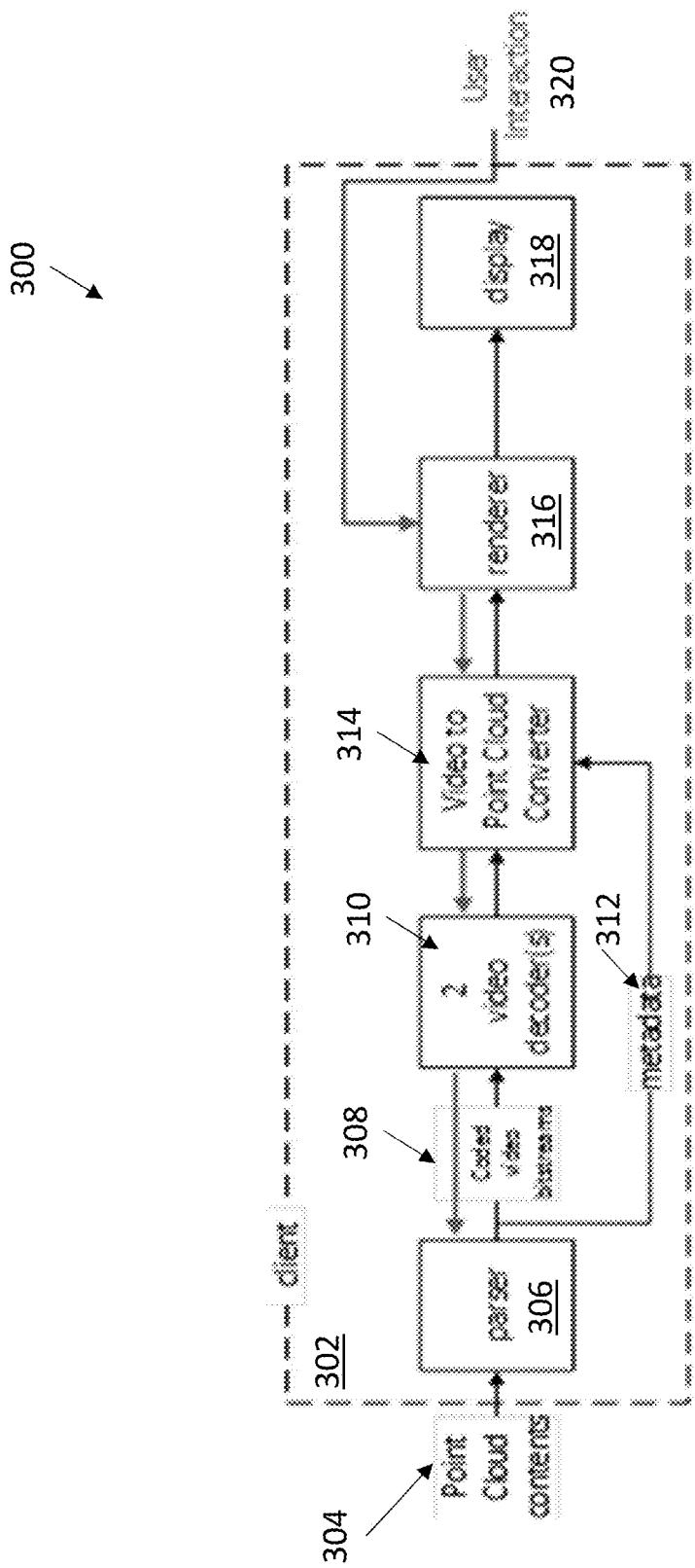
FIG. 3 shows an exemplary processing flow for point cloud content, according to some examples.

MPEG has been working on point cloud compression to reduce the size of point cloud data, which can enable streaming of point cloud data in real-time for consumption on other devices. FIG. 3 shows an exemplary processing flow 300 for point cloud content as a specific instantiation of the general viewport/ROI (e.g., 3DoF/6DoF) processing model, according to some examples. The processing flow 300 is described in further detail in, for example, N17771, "PCC WD V-PCC (Video-based PCC)," July 2018, Ljubljana, SI, which is hereby incorporated by reference herein in its entirety. The client 302 receives the point cloud media content file 304, which is composed of two 2D planar video bit streams and metadata that specifies a 2D planar video to 3D volumetric video conversion. The content 2D planar video to 3D volumetric video conversion metadata can be located either at the file level as timed metadata track(s) or inside the 2D video bitstream as SEI messages.

The parser module 306 reads the point cloud contents 304. The parser module 306 delivers the two 2D video bitstreams 308 to the 2D video decoder 310. The parser module 306 delivers the 2D planar video to 3D volumetric video conversion metadata 312 to the 2D video to 3D point cloud converter module 314. The parser module 306 at the local client can deliver some data that requires remote rendering (e.g., with more computing power, specialized rendering engine, and/or the like) to a remote rendering module (not shown) for partial rendering. The 2D video decoder module 310 decodes the 2D planar video bitstreams 308 to generate 2D pixel data. The 2D video to 3D point cloud converter module 314 converts the 2D pixel data from the 2D video decoder(s) 310 to 3D point cloud data if necessary using the metadata 312 received from the parser module 306.

The renderer module 316 receives information about users' 6 degree viewport information and determines the portion of the point cloud media to be rendered. If a remote renderer is used, the users' 6DoF viewport information can also be delivered to the remote render module. The renderer module 316 generates point cloud media by using 3D data, or a combination of 3D data and 2D pixel data. If there are partially rendered point cloud media data from a remote renderer module, then the renderer 316 can also combine such data with locally rendered point cloud media to generate the final point cloud video for display on the display 318. User interaction information 320, such as a user's location in 3D space or the direction and viewpoint of the user, can be delivered to the modules involved in processing the point cloud media (e.g., the parser 306, the 2D video decoder(s) 310, and/or the video to point cloud converter 314) to dynamically change the portion of the data for adaptive rendering of content according to the user's interaction information 320.

Figure 4:
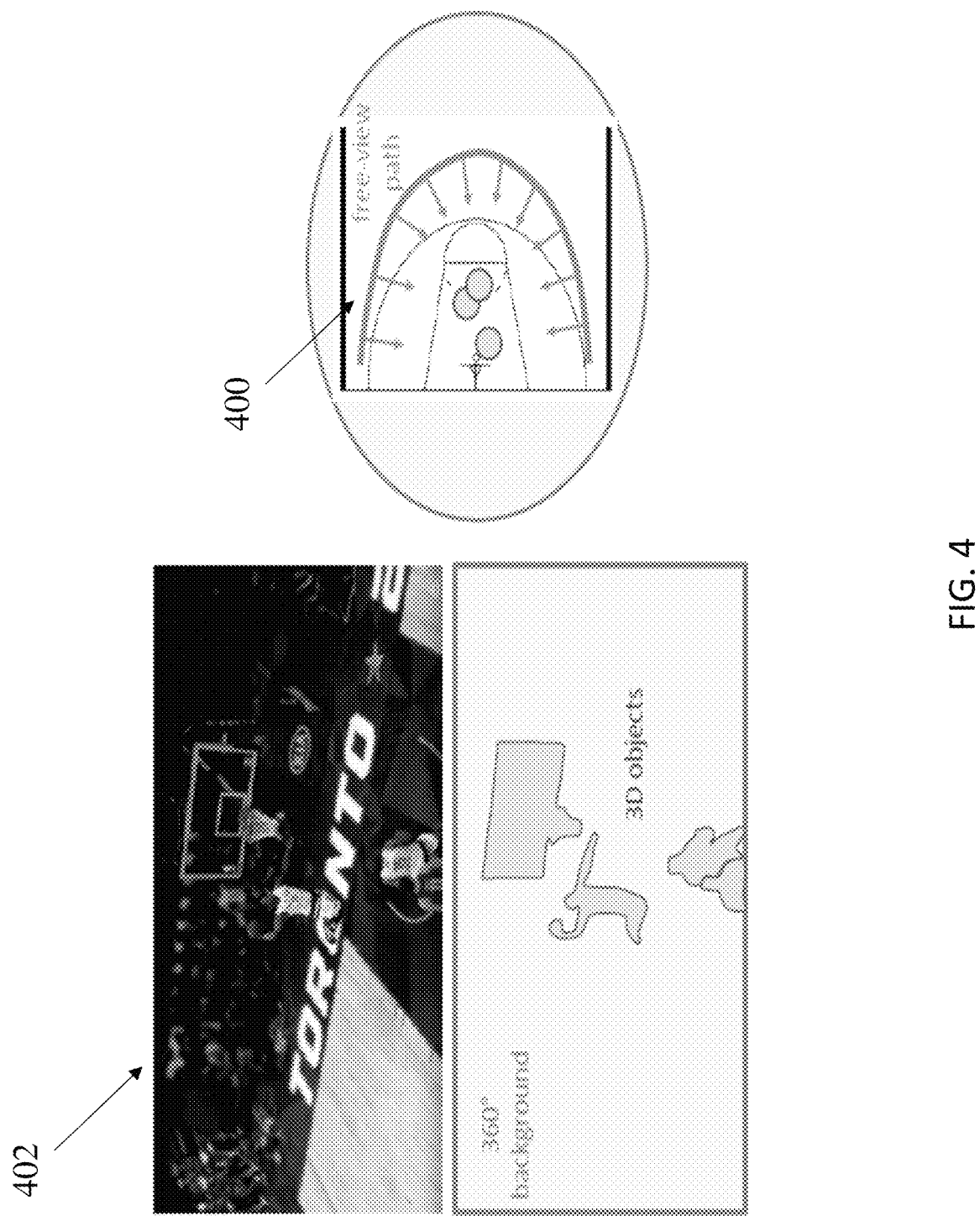
FIG. 4 shows an example of a free-view path, according to some examples.

User interaction information for point cloud media needs to be provided in order to achieve such user interaction-based rendering. In particular, the user interaction information 320 needs to be specified and signaled in order for the client 302 to communicate with the render module 316, including to provide information of user-selected viewports. Point cloud content can be presented to the user via editor cuts, or as recommended or guided views or viewports. FIG. 4 shows an example of a free-view path 400, according to some examples. The free-view path 400 allows the user to move about the path to view the scene 402 from different viewpoints.

Viewports, such as recommended viewports (e.g., Video-based Point Cloud Compression (V-PCC) viewports), can be signaled for point cloud content. A point cloud viewport, such as a PCC (e.g., V-PCC or G-PCC (Geometry based Point Cloud Compression)) viewport, can be a region of point cloud content suitable for display and viewing by a user. Depending on a user's viewing device(s), the viewport can be a 2D viewport or a 3D viewport. For example, a viewport can be a 3D spherical region or a 2D planar region in the 3D space, with six degrees of freedom (6 DoF). The techniques can leverage 6D spherical coordinates (e.g., '6dsc') and/or 6D Cartesian coordinates (e.g., '6dcc') to provide point cloud viewports. Viewport signaling techniques, including leveraging '6dsc' and '6dcc,' are described in co-owned U.S. patent application Ser. No. 16/738,387, titled "Methods and Apparatus for Signaling Viewports and Regions of Interest for Point Cloud Multimedia Data," which is hereby incorporated by reference herein in its entirety. The techniques can include the 6D spherical coordinates and/or 6D Cartesian coordinates as timed metadata, such as timed metadata in ISOBMFF. The techniques can use the 6D spherical coordinates and/or 6D Cartesian coordinates to specify 2D point cloud viewports and 3D point cloud viewports, including for V-PCC content stored in ISOBMFF files. The '6dsc' and '6dcc' can be natural extensions to the 2D Cartesian coordinates '2dcc' for planar regions in the 2D space, as provided for in MPEG-B part 10.

In V-PCC, the geometry and texture information of a video-based point cloud is converted to 2D projected frames and then compressed as a set of different video sequences. The video sequences can be of three types: one representing the occupancy map information, a second representing the geometry information and a third representing the texture information of the point cloud data. A geometry track may contain, for example, one or more geometric aspects of the point cloud data, such as shape information, size information, and/or position information of a point cloud. A texture track may contain, for example, one or more texture aspects of the point cloud data, such as color information (e.g., RGB (Red, Green, Blue) information), opacity information, reflectance information and/or albedo information of a point cloud. These tracks can be used for reconstructing the set of 3D points of the point cloud. Additional metadata needed to interpret the geometry and video sequences, such as auxiliary patch information, can also be generated and compressed separately. While examples provided herein are explained in the context of V-PCC, it should be appreciated that such examples are intended for illustrative purposes, and that the techniques described herein are not limited to V-PCC.

V-PCC has yet to finalize a track structure. An exemplary track structure under consideration in the working draft of V-PCC in ISOBMFF is described in N18059, "WD of Storage of V-PCC in ISOBMFF Files," October 2018, Macau, CN, which is hereby incorporated by reference herein in its entirety. The track structure can include a track that includes a set of patch streams, where each patch stream is essentially a different view for looking at the 3D content. As an illustrative example, if the 3D point cloud content is thought of as being contained within a 3D cube, then there can be six different patches, with each patch being a view of one side of the 3D cube from the outside of the cube. The track structure also includes a timed metadata track and a set of restricted video scheme tracks for geometry, attribute (e.g., texture), and occupancy map data. The timed metadata track contains V-PCC specified metadata (e.g., parameter sets, auxiliary information, and/or the like). The set of restricted video scheme tracks can include one or more restricted video scheme tracks that contain video-coded elementary streams for geometry data, one or more restricted video scheme tracks that contain video coded elementary streams for texture data, and a restricted video scheme track containing a video-coded elementary stream for occupancy map data. The V-PCC track structure can allow changing and/or selecting different geometry and texture data, together with the timed metadata and the occupancy map data, for variations of viewport content. It can be desirable to include multiple geometry and/or texture tracks for a variety of scenarios. For example, the point cloud may be encoded in both a full quality and one or more reduced qualities, such as for the purpose of adaptive streaming. In such examples, the encoding may result in multiple geometry/texture tracks to capture different samplings of the collection of 3D points of the point cloud. Geometry/texture tracks corresponding to finer samplings can have better qualities than those corresponding to coarser samplings. During a session of streaming the point cloud content, the client can choose to retrieve content among the multiple geometry/texture tracks, in either a static or dynamic manner (e.g., according to client's display device and/or network bandwidth).

A point cloud tile can represent 3D and/or 2D aspects of point cloud data. For example, as described in N18188, entitled "Description of PCC Core Experiment 2.19 on V-PCC tiles, Marrakech, MA (January 2019), V-PCC tiles can be used for Video-based PCC. An example of Video-based PCC is described in N18180, entitled "ISO/IEC 23090-5: Study of CD of Video-based Point Cloud Compression (V-PCC)," Marrakech, MA (January 2019). Both N18188 and N18180 are hereby incorporated by reference herein in their entirety. A point cloud tile can include bounding regions or boxes to represent the content or portions thereof, including bounding boxes for the 3D content and/or bounding boxes for the 2D content. In some examples, a point cloud tile includes a 3D bounding box, an associated 2D bounding box, and one or more independent coding unit(s) (ICUs) in the 2D bounding box. A 3D bounding box can be, for example, a minimum enclosing box for a given point set in three dimensions. A 3D bounding box can have various 3D shapes, such as the shape of a rectangular parallelpiped that can be represented by two 3-tuples (e.g., the origin and the length of each edge in three dimensions). A 2D bounding box can be, for example, a minimum enclosing box (e.g., in a given video frame) corresponding to the 3D bounding box (e.g., in 3D space). A 2D bounding box can have various 2D shapes, such as the shape of a rectangle that can be represented by two 2-tuples (e.g., the origin and the length of each edge in two dimensions). There can be one or more ICUs (e.g., video tiles) in a 2D bounding box of a video frame. The independent coding units can be encoded and/or decoded without the dependency of neighboring coding units.

Figure 5:
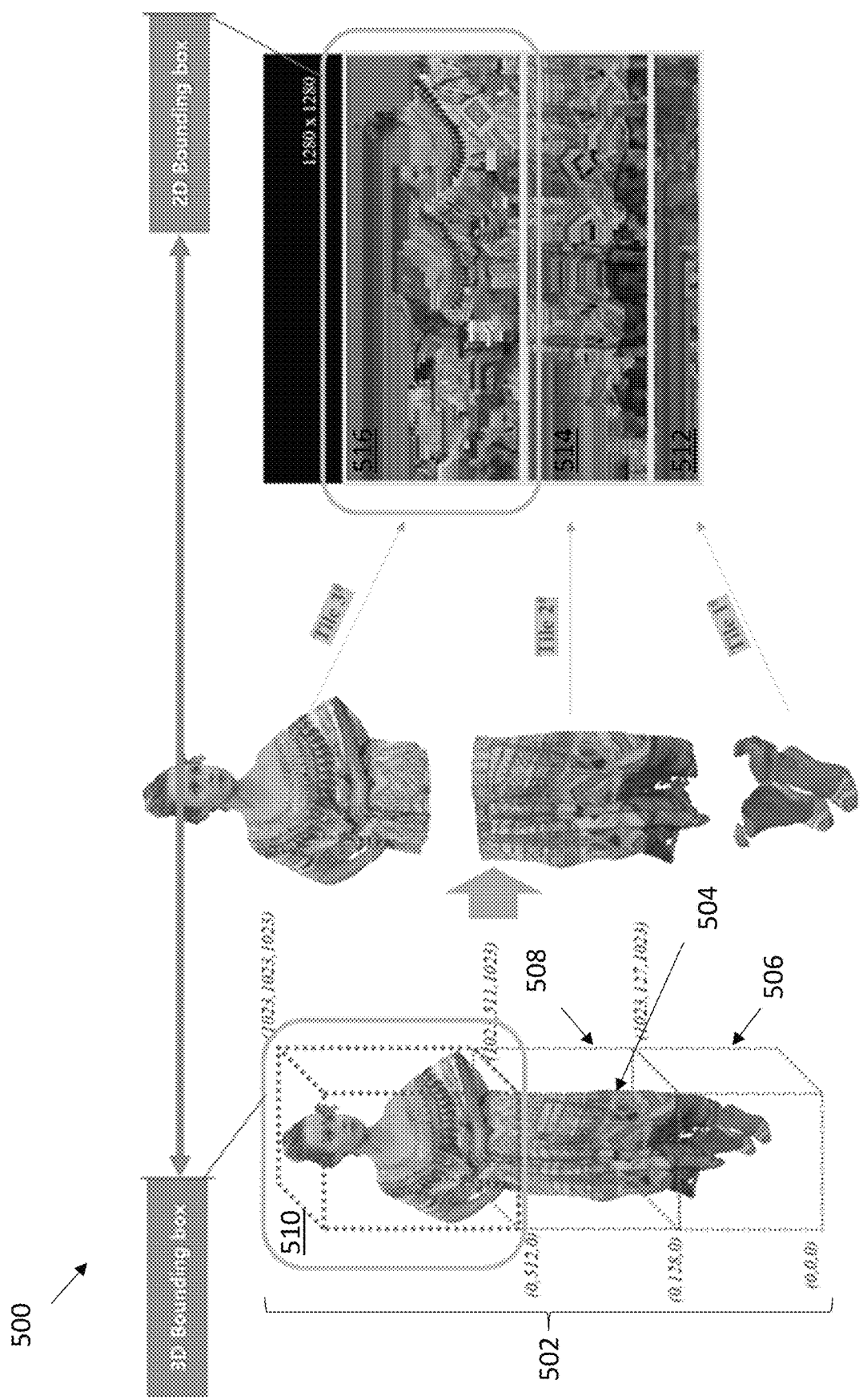
FIG. 5 is a diagram showing exemplary point cloud tiles, including 3D and 2D bounding boxes, according to some examples.

FIG. 5 is a diagram showing exemplary point cloud tiles, including 3D and 2D bounding boxes, according to some examples. Point cloud content typically only includes a single 3D bounding box around the 3D content, shown in FIG. 5 as the large box 502 surrounding the 3D point cloud content 504. As described above, a point cloud tile can include a 3D bounding box, an associated 2D bounding box, and one or more independent coding unit(s) (ICUs) in the 2D bounding box. To support viewport dependent processing, the 3D point cloud content typically needs to be subdivided into smaller pieces or tiles. FIG. 5 shows, for example, the 3D bounding box 502 can be divided into smaller 3D bounding boxes 506, 508 and 510, which each have an associated 2D bounding box 512, 514 and 516, respectively.

As described herein, some embodiments of the techniques can include, for example, sub-dividing the tiles (e.g., sub-dividing 3D/2D bounding boxes) into smaller units to form desired ICUs for V-PCC content. The techniques can encapsulate the sub-divided 3D volumetric regions and 2D pictures into tracks, such as into ISOBMFF visual (e.g., sub-volumetric and sub-picture) tracks. For example, the content of each bounding box can be stored into an associated sets of tracks, where each of the sets of tracks stores the content of one of the sub-divided 3D sub-volumetric regions and/or 2D sub-pictures. For the 3D sub-volumetric case, such a set of tracks include tracks that store geometry, attribute and texture attributes. For the 2D sub-picture case, such a set of tracks may just contain a single track that stores the sub-picture content. The techniques can provide for signaling relationships among the sets of tracks, such as signaling the respective 3D/2D spatial relationships of the sets of tracks using track groups and/or sample groups of '3dcc' and '2dcc' types. The techniques can signal the tracks associated with a particular bounding box, a particular sub-volumetric region or a particular sub-picture, and/or can signal relationships among the sets of tracks of different bounding boxes, sub-volumetric regions and sub-pictures. Providing point cloud content in separate tracks can facilitate advanced media processing not otherwise available for point cloud content, such as point cloud tiling (e.g., V-PCC tiling) and viewport-dependent media processing.

In some embodiments, the techniques provide for dividing the point cloud bounding boxes into sub-units. For example, the 3D and 2D bounding boxes can be sub-divided into 3D sub-volumetric boxes and 2D sub-picture regions, respectively. The sub-regions can provide ICUs that are sufficient for track-based rendering techniques. For example, the sub-regions can provide ICUs that are fine enough from a systems point of view for delivery and rendering in order to support the viewport dependent media processing. In some embodiments, the techniques can support viewport dependent media processing for V-PCC media content, e.g., as provided in m46208, entitled "Timed Metadata for (Recommended) Viewports of V-PCC Content in ISOBMFF," Marrakech, MA (January 2019), which his hereby incorporated by reference herein in its entirety. As described further herein, each of the sub-divided 3D sub-volumetric boxes and 2D sub-picture regions can be stored in tracks in a similar manner as if they are (e.g., un-sub-divided) 3D boxes and 2D pictures, respectively, but with smaller sizes in terms of their dimensions. For example, in the 3D case, a sub-divided 3D sub-volumetric box/region will be stored in a set of tracks comprising geometry, texture and attribute tracks. As another example, in the 2D case, a sub-divided sub-picture region will be stored in a single (sub-picture) track. As a result of sub-dividing the content into smaller sub-volumes and sub-pictures, the ICUs can be carried in various ways. For example, in some embodiments different sets of tracks can be used to carry different sub-volumes or sub-pictures, such that the tracks carrying the sub-divided content have less data compared to when storing all of the un-sub-divided content. As another example, in some embodiments some and/or all of the data (e.g., even when subdivided) can be stored in the same tracks, but with smaller units for the sub-divided data and/or ICUs (e.g., so that the ICUs can be individually accessed in the overall set of track(s)).

Figure 6:
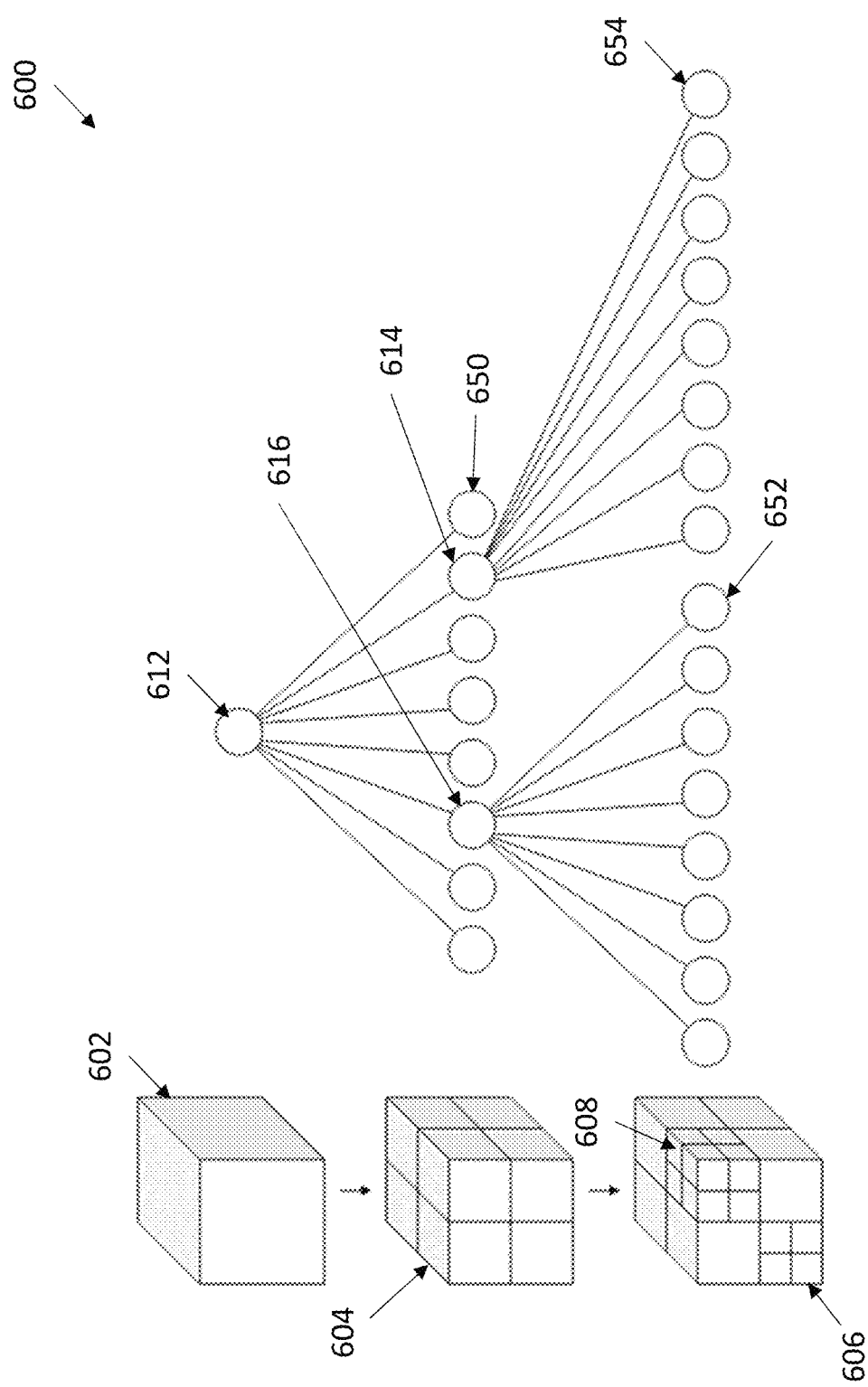
FIG. 6 is a diagram showing an exemplary octree-based division for 3D sub-volumetric decomposition, according to some embodiments.

Various types of division can be used to provide the sub-units or ICUs, including 3D and 2D divisions. FIG. 6 is a diagram 600 showing an exemplary octree-based division for 3D sub-volumetric decomposition, according to some embodiments. As shown on the left, a 3D bounding box 602 can be divided into eight sub-regions 604, which can be further sub-divided as shown for sub-regions 606 and 608. In some embodiments, the system can determine how to divide and further sub-divided the point cloud content based on various parameters, such as the ROIs associated with the point cloud content, an amount of detail that is supported for a particular side, and/or the like. Referring to the tree structure, each interior node (e.g., nodes 612, 614 and 616) in the tree represents a 3D source, which is divided into a plurality of regions such that each sub-node represents the sub-volumetric tracks. As described further herein, a track group (e.g., a '3dcc' track group) can be used to represent the sub-volumetric tracks.

Figure 7:
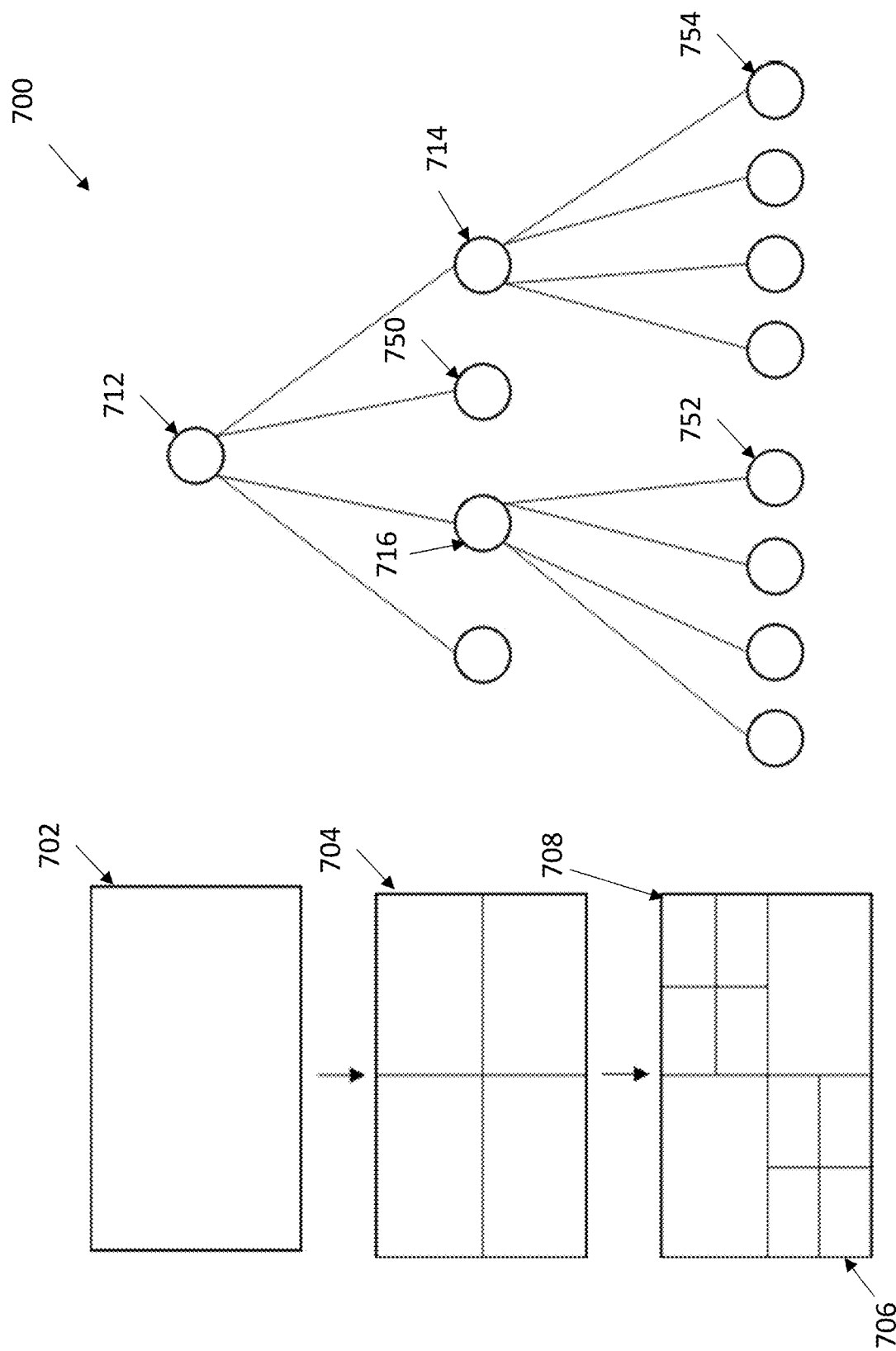
FIG. 7 is a diagram showing an exemplary quadtree-based division for 2D sub-picture decomposition, according to some embodiments.

FIG. 7 is a diagram 700 showing an exemplary quadtree-based division for 2D sub-picture decomposition, according to some embodiments. As shown on the left, a 2D bounding box 702 can be divided into four sub-regions 704, which can be further sub-divided as shown for sub-regions 706 and 708. Each interior node (e.g., nodes 712, 714 and 716) in the tree represents a 2D source, which is divided into a plurality of regions such that each sub-node represents the sub-picture tracks. As described further herein, a track group (e.g., a '2dcc' track group) can be used to represent the sub-picture tracks.

The subdivided 2D and 3D regions may be of various shapes, such as squares, cubes, rectangles, and/or arbitrary shapes. The division along each dimension may not be binary. Therefore, each division tree of an outer-most 2D/3D bounding box can be much more general than the quadtree and octree examples provided herein. It should therefore be appreciated that various shapes and subdivision strategies can be used to determine each leaf region in the division tree, which represents an ICU (in the 2D or 3D space or bounding box). As described herein, the ICUs can be configured such that for end-to-end media systems the ICUs support viewport dependent processing (including delivery and rendering). For example, the ICUs can be configured according to m46208, where a minimal number of ICUs can be spatially randomly accessible for covering a viewport that is potentially dynamically moving (e.g., for instance, controlled by the user on a viewing device or based on a recommendation from the editor).

The point cloud ICUs can be carried in associated, separate tracks. In some embodiments, the ICUs and division trees can be carried and/or encapsulated in respective sub-volumetric and sub-picture tracks and track groups. The spatial relationship and sample groups of the sub-volumetric and sub-picture tracks and track groups can be signaled in, for example, ISOBMFF as described in ISO/IEC 14496-12.

Some embodiments can leverage, for the 2D case, the generic sub-picture track grouping extensions with the track grouping type '2dcc' as provided in OMAF, e.g., as provided in Section 7.1.11 of the working draft of OMAF, 2nd Edition, N18227, entitled "WD 4 of ISO/IEC 23090-2 OMAF 2nd edition," Marrakech, MA (January 2019), which is hereby incorporated by reference herein in its entirety. Some embodiments can update and extend, for the 3D case, the generic sub-volumetric track grouping extension with a new track grouping type '3dcc'. Such 3D and 2D track grouping mechanisms, can be used to group the example (leaf node) sub-volumetric tracks in the octree decomposition and sub-picture tracks in the quadtree decomposition into three '3dcc' and '2dcc' track groups, respectively.

Figure 8:
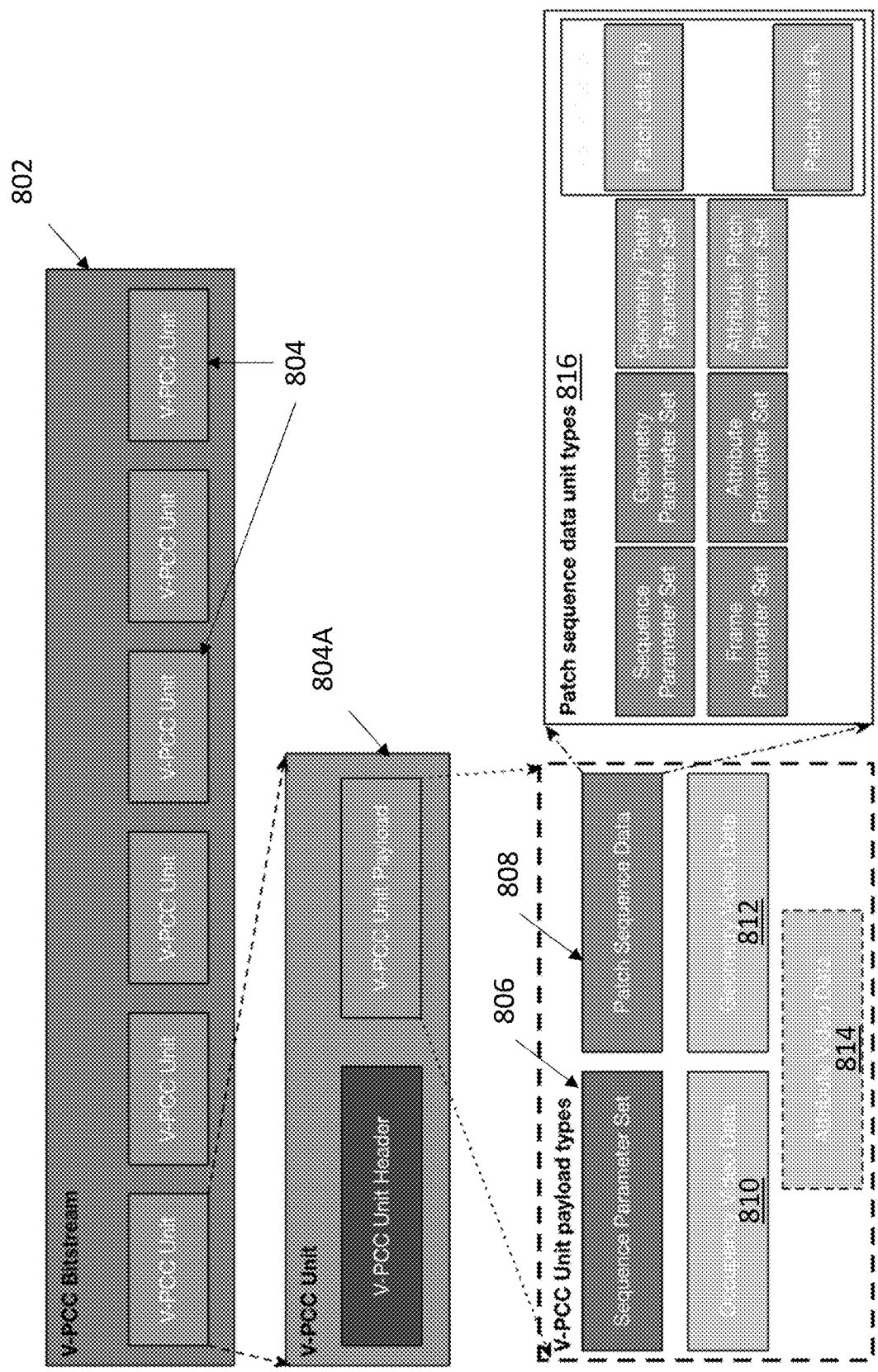
FIG. 8 shows a V-PCC bitstream that is composed of a set of V-PCC units, according to some examples.

A point cloud bit stream can include a set of units that carry the point cloud content. The units can allow, for example, random access to the point cloud content (e.g., for ad insertion and/or other time-based media processing). For example, V-PCC can include a set of V-PCC Units, as described in N18180, "ISO/IEC 23090-5: Study of CD of Video-based Point Cloud Compression (V-PCC)," Marrakech, MA. January 2019, which is hereby incorporated by reference herein in its entirety. FIG. 8 shows a V-PCC bitstream 802 that is composed of a set of V-PCC units 804, according to some examples. Each V-PCC unit 804 has a V-PCC unit header and a V-PCC unit payload, as shown for V-PCC unit 804A, which includes V-PCC unit header and a V-PCC unit payload. The V-PCC unit header describes the V-PCC unit type. The V-PCC unit payload can include a sequence parameter set 806, patch sequence data 808, occupancy video data 810, geometry video data 812, and attribute video data 814. The patch sequence data unit 808 can include one or more patch sequence data unit types 816 as shown (e.g., sequence parameter set, frame parameter set, geometry parameter set, attribute parameter set, geometry patch parameter set, attribute patch parameter set, and/or patch data, in this non-limiting example).

In some examples, the occupancy, geometry, and attribute Video Data unit payloads 810, 812 and 814, respectively, correspond to video data units that could be decoded by the video decoder specified in the corresponding occupancy, geometry, and attribute parameter set V-PCC units. Referring to the patch sequence data unit types, V-PCC considers an entire 3D bounding box (e.g., 502 in FIG. 5) to be a cube, and considers projection onto one surface of the cube to be a patch (e.g., such that there can be six patches for each side). Therefore, the patch information can be used to indicate how the patches are encoded and relate to each other.

Figure 9:
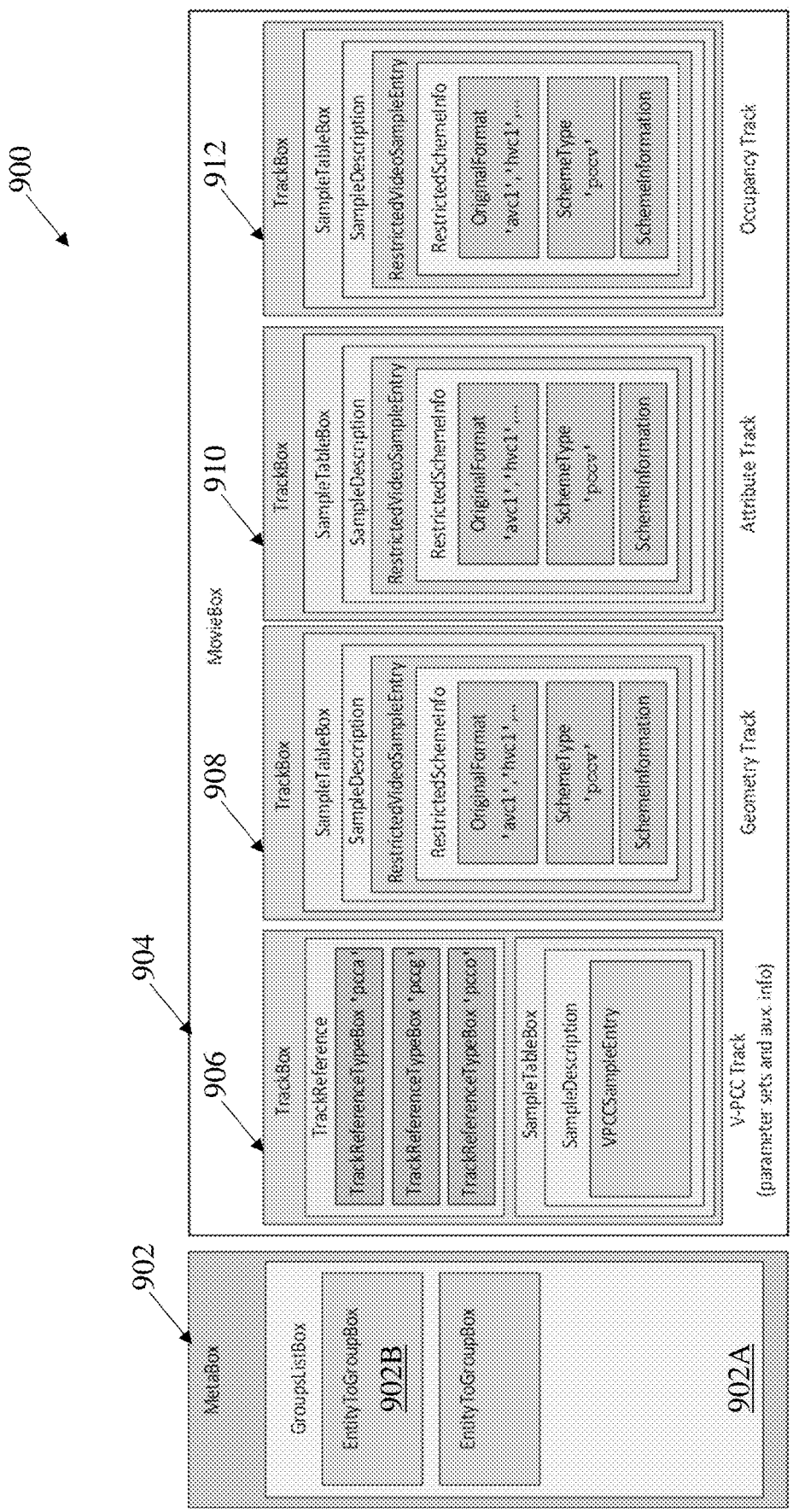
FIG. 9 shows an ISOBMFF-based V-PCC container, according to some examples.

FIG. 9 shows an ISOBMFF-based V-PCC container 900, according to some examples. The container 900 can be, for example, as documented in the latest WD of Carriage of Point Cloud Data N18266m "WD of ISO/IEC 23090-10 Carriage of PC data," Marrakech, MA. January 2019, which is hereby incorporated by reference herein in its entirety. As shown, the V-PCC container 900 includes a metadata box 902 and a movie box 904 that includes a V-PCC parameter track 906, a geometry track 908, an attribute track 910, and an occupancy track 912. Therefore, the movie box 904 includes the general tracks (e.g., geometry, attribute, and occupancy tracks), and a separate metadata box track 902 includes the parameters and grouping information.

As an illustrative example, each EntityToGroupBox 902B in the GroupListBox 902A of the Metabox 902 contains a list of references to entities, which in this example include a list of references to the V-PCC parameter track 906, the geometry track 908, the attribute track 910, and the occupancy track 912. A device uses those referenced tracks to collectively re-construct a version of the underlying point cloud content (e.g., with a certain quality).

Various structures can be used to carry point cloud content. For example, as described in N18479, entitled "Continuous Improvement of Study Test of ISO/IEC CD 23090-5 Video-based Point Cloud Compression", Geneva, CH (March 2019), which is hereby incorporated by reference herein in its entirety, the V-PCC bitstream may be composed of a set of V-PCC units as shown in FIG. 8. In some embodiments, each V-PCC unit may have a V-PCC unit header and a V-PCC unit payload. The V-PCC unit header describes the V-PCC unit type.

As described herein, the occupancy, geometry, and attribute Video Data unit payloads correspond to video data units that could be decoded by the video decoder specified in the corresponding occupancy, geometry, and attribute parameter set V-PCC units. As described in N18485, entitled "V-PCC CE 2.19 on tiles", Geneva, CH (March 2019), which is hereby incorporated by reference herein in its entirety, the Core Experiment (CE) may be used to investigate the V-PCC tiles for Video-based PCC as specified in N18479, for meeting the requirements of parallel encoding and decoding, spatial random access, and ROI-based patch packing.

A V-PCC tile may be a 3D bounding box, a 2D bounding box, one or more Independent coding unit(s) (ICUs), and/or an equivalent structure. For example, this is described in conjunction with exemplary FIG. 5 and described in m46207, entitled "Track Derivation for Storage of V-PCC Content in ISOBMFF," Marrakech, MA (January 2019), which is hereby incorporated by reference herein in its entirety. In some embodiments, the 3D bounding box may be a minimum enclosing box for a given point set in 3 dimensions. A 3D bounding box with the shape of a rectangular parallel-piped can be represented by two 3-tuples. As an example, the two 3-tuples may include the origin and the length of each edge in three dimensions. In some embodiments, the 2D bounding box may be a minimum enclosing box (e.g. in a given video frame) corresponding to the 3D bounding box (e.g. in 3D space). A 2D bounding box with the shape of a rectangle can be represented by two 2-tuples. For example, the two 2-tuples may include the origin and the length of each edge in two dimensions. In some embodiments, there can be one or more independent coding units (ICUs), (e.g., video tiles) in a 2D bounding box of a video frame. The independent coding units may be encoded and decoded without the dependency of neighboring coding units.

In some embodiments, the 3D and 2D bounding boxes may be subdivided into 3D sub-volumetric regions and 2D sub-pictures, respectively, (e.g. as provided in m46207, "Track Derivation for Storage of V-PCC Content in ISOBMFF," Marrakech, MA. (January 2019) and m47355, "On Track Derivation Approach to Storage of Tiled V-PCC Content in ISOBMFF," Geneva, CH. (March 2019), which are hereby incorporated by reference herein in their entirety) so that they become needed ICUs that are fine enough also from the Systems point of view for delivery and rendering in order to support the viewport dependent media processing for V-PCC media content as described in m46208.

As described above, FIG. 6 shows an example of a octree-based division of a 3D sub-volumetric decomposition, and FIG. 7 shows an example of a quadtree-based division of a 2D sub-picture decomposition.

Quadtrees can be considered the 2D analog of 3D octrees, and are most often used to partition 2D and 3D spaces by recursively subdividing them into four quadrants and eight octants or regions.

For the purpose of tiling V-PCC media content, the subdivided 2D pictures and 3D regions may be square-shaped, cube-shaped, rectangular-shaped, and/or may have arbitrary shapes. Furthermore, the division along each dimension may not necessarily be binary. Thus, each division tree of an out-most 2D/3D bounding box can be much more general than quadtree and/or octree. Regardless of the shape, from the end-to-end media system point of view, each leaf sub-picture or region in the division tree may represent an ICU (e.g., within the 2D or 3D bounding box), for supporting viewport dependent processing, which may include delivery and rendering, as described in m46208), where a minimal number of ICUs can be spatially random accessible for covering a viewport that is potentially dynamically moving, for instance, controlled by the user on a viewing device or based on a recommendation from the editor.

The inventors have appreciated various deficiencies with using conventional point cloud container techniques. For example, taking the above consideration of tiling V-PCC media content, the structure for an ISOBMFF-based V-PCC container (e.g., as shown in FIG. 9 and/or the V-PCC container described in N18413, entitled "WD of ISO/IEC 23090-10 Carriage of PC data," Geneva, CH (March 2019), which is hereby incorporated by reference herein in its entirety) becomes inadequate. For example, each of the leaf nodes for the sub-divided 2D sub-pictures and 3D sub-regions of a conventional ISOBMFF-based V-PCC container needs to be carried as a valid elementary V-PCC media track, and each of the non-leaf nodes need to be carried as a valid composite V-PCC media track as well.

The inventors have appreciated that it is desirable to provide techniques for encoding and/or decoding point cloud video data using separate patch tracks that each encode an associated different portion of the point cloud content in a single immersive media structure. The techniques described herein provide for a new point cloud content structure that leverages separate patch tracks to break up and encode the original immersive media content (e.g., which can include 2D and/or 3D point cloud content) such that multiple patch tracks can be included in the immersive media structure and can share one or more common elementary data tracks (e.g., including one or more geometry, attribute, and/or occupancy tracks).

In some embodiments of the invention, a patch track based container structure (e.g., an ISOBMFF V-PCC container structure) can be used to store V-PCC media content. The patch track based container structure can specify separate V-PCC patch tracks that encode data for different portions of the point cloud content while sharing some and/or all of the same elementary data tracks (e.g., including one or more geometry, attribute, and/or occupancy tracks). The patch track-based container structure can, for example, be used as an alternative to derived track based structures, such as those described in m46207 and m47355. In some embodiments, 2D/3D spatial grouping mechanisms of patch tracks can be used when V-PCC media content is subdivided at either V-PCC level or systems level, such as by using 2D sub-picture and 3D sub-region grouping mechanisms. For example, the techniques can use the 2D sub-picture and 3D sub-region grouping mechanisms described in m47335, entitled "Signaling of 2D and 3D spatial relationship and sample groups for V-PCC Sub-Volumetric Tracks in ISOBMFF," Geneva, CH, (March 2019), which is hereby incorporated by reference herein in its entirety.

Figure 10:
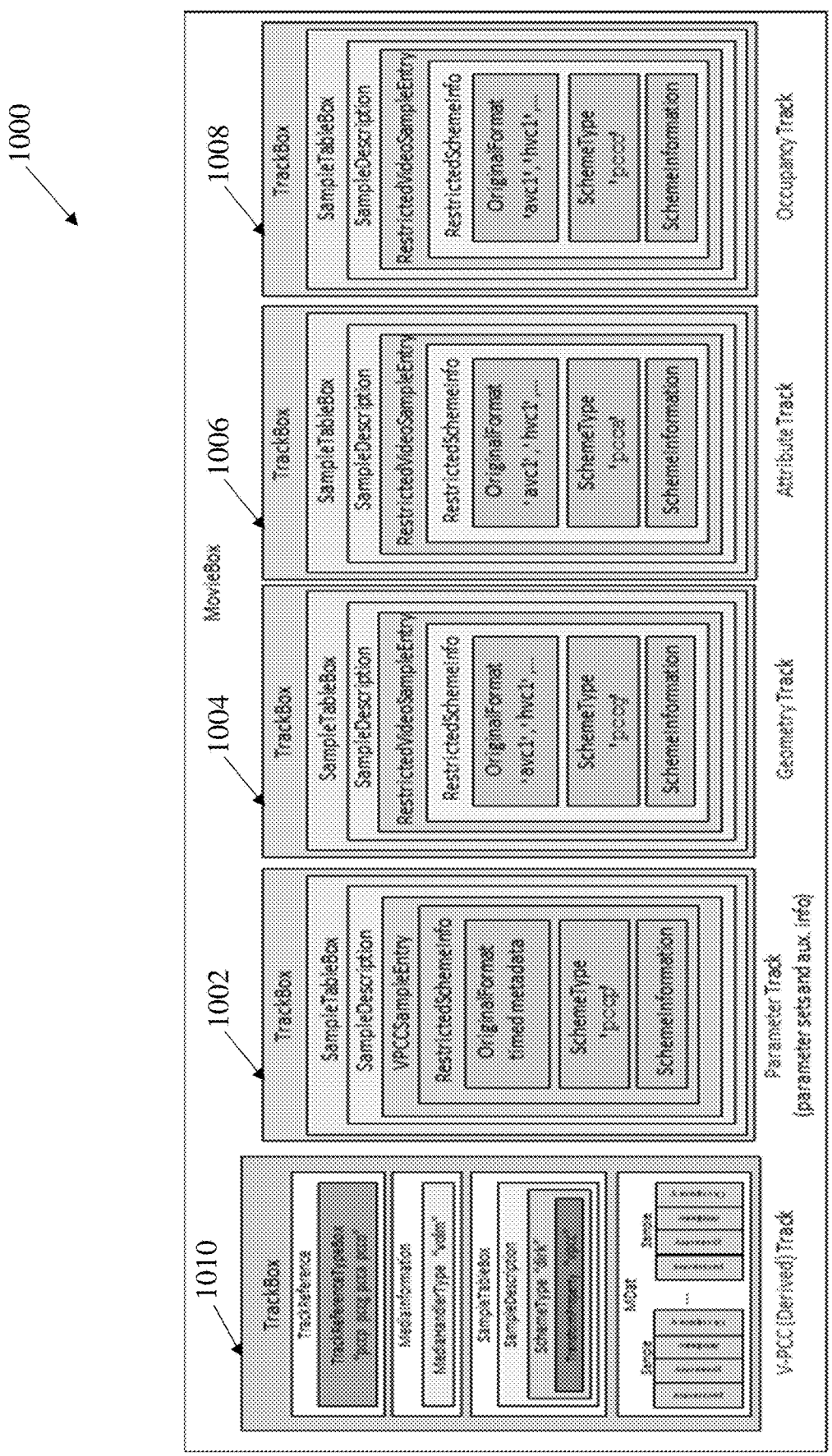
FIG. 10 shows an example of a point cloud structure designed to support track derivations, according to some embodiments.

According to some embodiments, point cloud container structures, such as the patch track based ISOBMFF container structure, can be used to store V-PCC media content. According to some embodiments, track groups and sample groups (e.g., of the '2dcc' and '3dcc' types) may be used for signaling of 3D/2D spatial relationships of patch tracks for V-PCC tiles (or sub-divisions). For example, the track groups disclosed in m47335 can be used to signal the 2D/3D spatial relationships of the V-PCC content. FIG. 10 is an exemplary diagram of a container structure 1000 for patch track based storage of V-PCC content in ISOBMFF, according to some embodiments. The diagram 1000 is based on the V-PCC bit stream structure (e.g. as provided in N18485). In this ISOBMFF container structure 1000, V-PCC Component Data Units may be stored in their respective tracks (e.g., as described in N18413), without requiring the parameter (metadata) track having to make references to the other tracks. As shown in this example, the other tracks in the container structure 100 may include a parameter track 1002 which can contain V-PCC defined timed metadata (for example, parameter sets and/or auxiliary information), one or more geometry video tracks 1004 containing video-coded elementary streams for geometry data, one or more attribute video tracks 1006 containing video coded elementary streams for attribute data, an occupancy map video track 1008 containing a video-coded elementary stream for occupancy map data, and/or the like. A V-PCC media track can be encoded as a single patch track with the new media (handler) type 'volm', for volumetric content, which may serve as the entry point for the V-PCC content. This track may make references to the component tracks which may include the parameter track, geometry video track, attribute track, occupancy video track, and/or the like.

According to some embodiments, the V-PCC media content can be tiled. V-PCC tiling or sub-division methods include patch-level partitioning, 3D grid division, and/or the like. With respect to the patch track based ISOBMFF V-PCC container structure, these methods correspond to a single container with multiple patch tracks and multiple containers of a single patch track.

Figure 11:
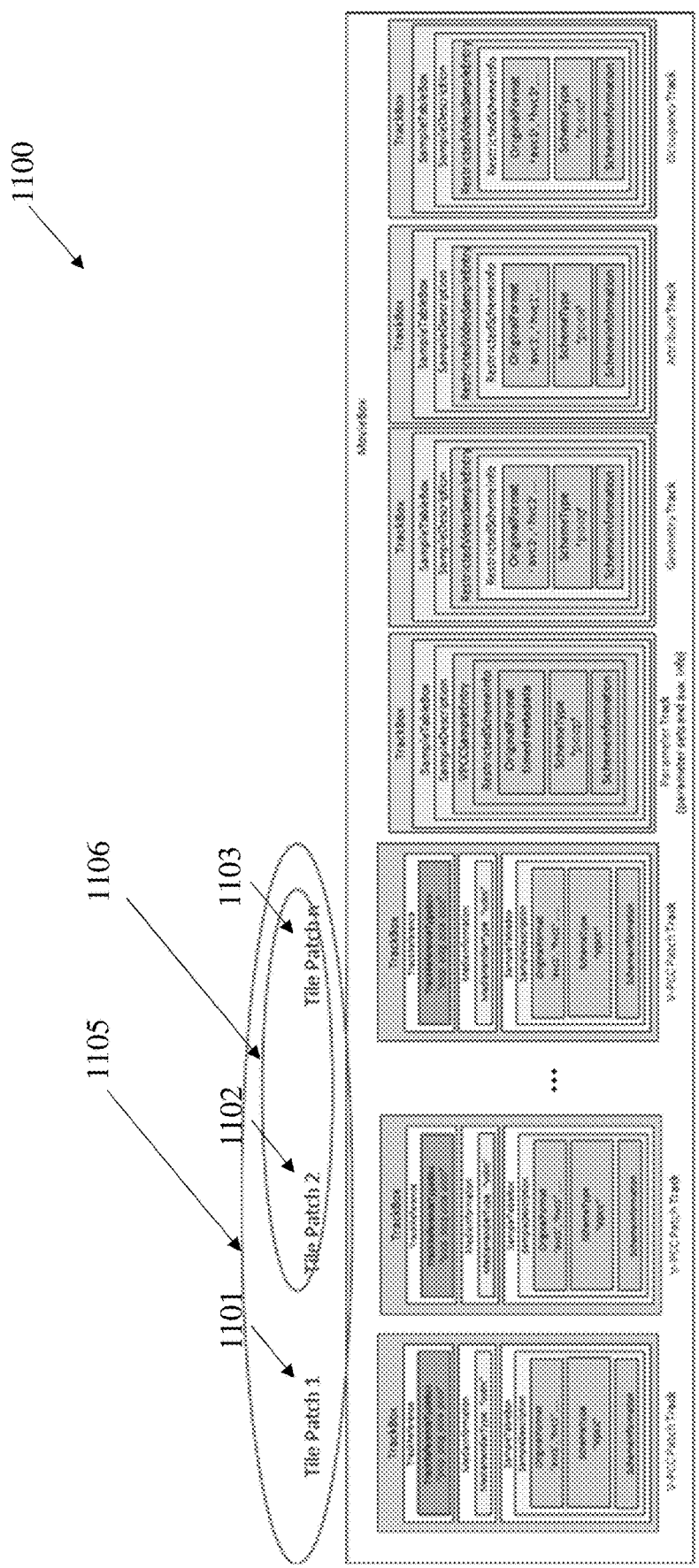
FIG. 11 shows an example of V-PCC patch-level partitioning, according to some embodiments.

In some embodiments, V-PCC tiling can be done using the patch-level partitioning method, wherein multiple tile patch tracks may be created within a single container, whereas the other component tracks (e.g., parameter, geometry, attribute and/or occupancy tracks) remain intact. FIG. 11 is an exemplary diagram of V-PCC patch-level partitioning, according to some embodiments. A number of tile patches, including 1101, 1102 and 1103 as examples, may be created within a single container 1100 according to the patch-level partitioning method. Each of the tile patch tracks can relate to associated partitioned V-PCC content. V-PCC content such as a V-PCC tile may be a 3D bounding box, a 2D bounding box and/or one or more ICU(s) as described herein and as can be seen in exemplary diagram FIG. 5.

Figure 12:
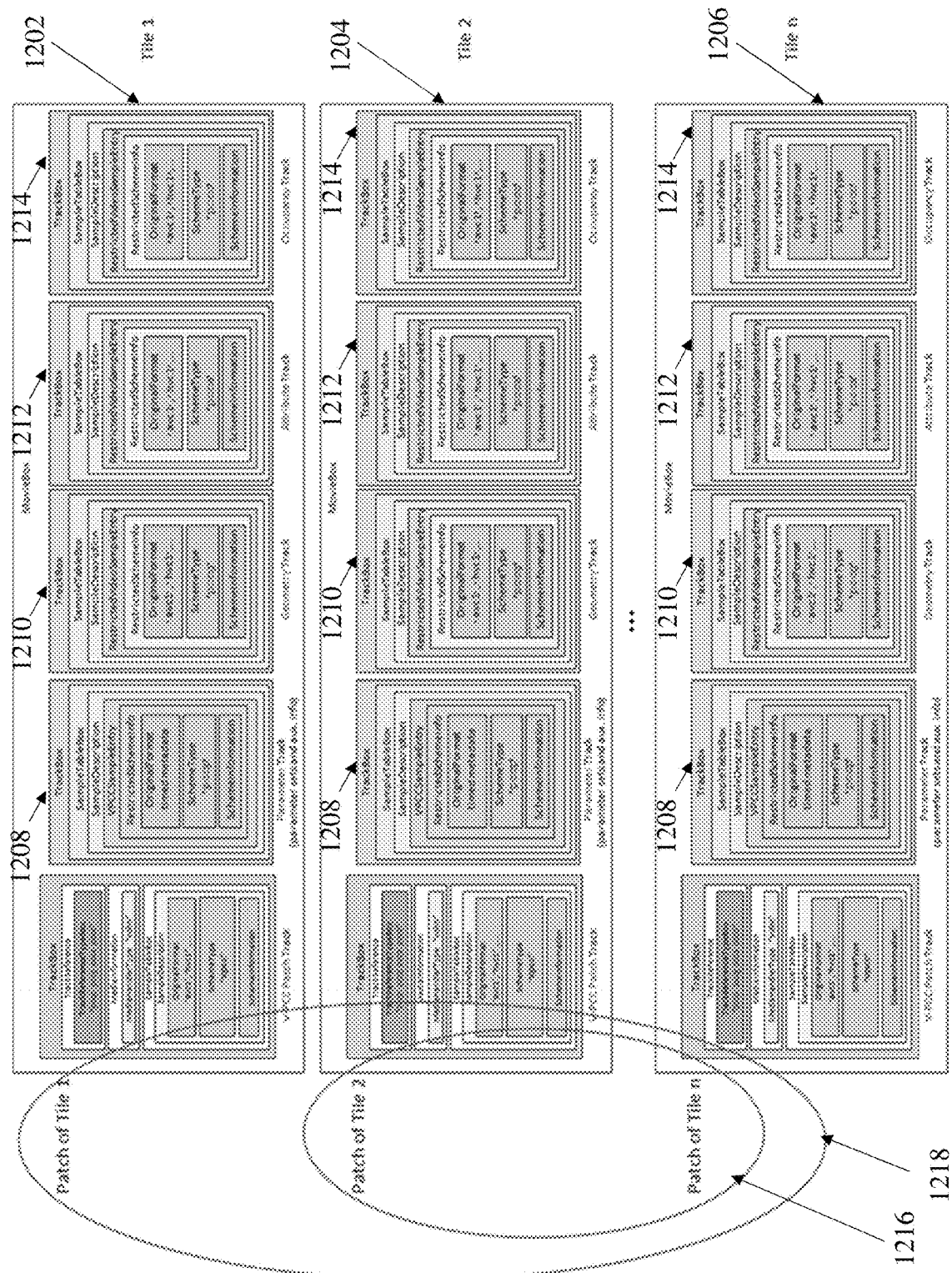
FIG. 12 is an diagram illustrating the association between V-PCC tracks and the component tracks.

In some embodiments, V-PCC tiling can be done using the 3D grid division method, wherein each 3D tile can be considered at the Systems level as a valid V-PCC media content by itself, and therefore encapsulated in a single ISOBMFF container. Hence, such techniques can result in multiple containers of a patch track together with the other component tracks. FIG. 12 is an exemplary diagram showing individual V-PCC tracks 1202, 1204, and 1206 (e.g. from FIG. 11) as each being associated with the component tracks including, for example, parameter 1208, geometry 1210, attribute 1212 and/or occupancy 1214 tracks, according to some embodiments of the present invention. It should be understood that while FIG. 12 appears to show multiple sets of the same component tracks (e.g. parameter 1208, geometry 1210, attribute 1212 and/or occupancy tracks 1214) for each tile, FIG. 12 exists solely for illustrative purposes to show that at the systems level each tile can be considered to be a valid V-PCC media content by itself. The track structure should include only one set of the component tracks as shown in FIG. 11.

According to some embodiments, the techniques relate to spatial grouping of tiled patch tracks of V-PCC media content. In some examples, 2D and 3D spatial relationships and/or sample groups can be used for spatial grouping. For example, 2D and 3D spatial relationship and sample groups for V-PCC sub-volumetric tracks can be signaled, such the techniques described in m47335 for ISOBMFF. For example, in the 2D case, the "generic sub-picture track grouping extensions" with the track grouping type '2dcc' (e.g., described in Section 7.1.11 of N18227) can be used for 2D tiles. As another example, for the 3D case, the "generic sub-volumetric track grouping extension" with the track grouping type '3dcc' can be used for 3D tiles.

FIG. 11 shows an example of the spatial grouping technique discussed herein. The track group 1105 is shown to contain another track group, 1106. Tile patches in different groups, including 1101, 1102 and 1103 as examples, may be created within a single container 1100 as is shown. The spatial grouping of V-PCC grid tiles can be realized by the spatial grouping of the corresponding tile tracks (i.e. by placing the corresponding 3D grouping boxes of type '3dcc', and/or the corresponding 2D grouping boxes of type '2dcc' within the tile tracks). Track groups 1216 and 1218 of FIG. 12 show individual V-PCC tracks 1202, 1204, and 1206 belonging to one or more track groups (e.g. from FIG. 11) as each being associated with the component tracks including, for example, parameter 1208, geometry 1210, attribute 1212 and/or occupancy 1214 tracks.

Figure 13:
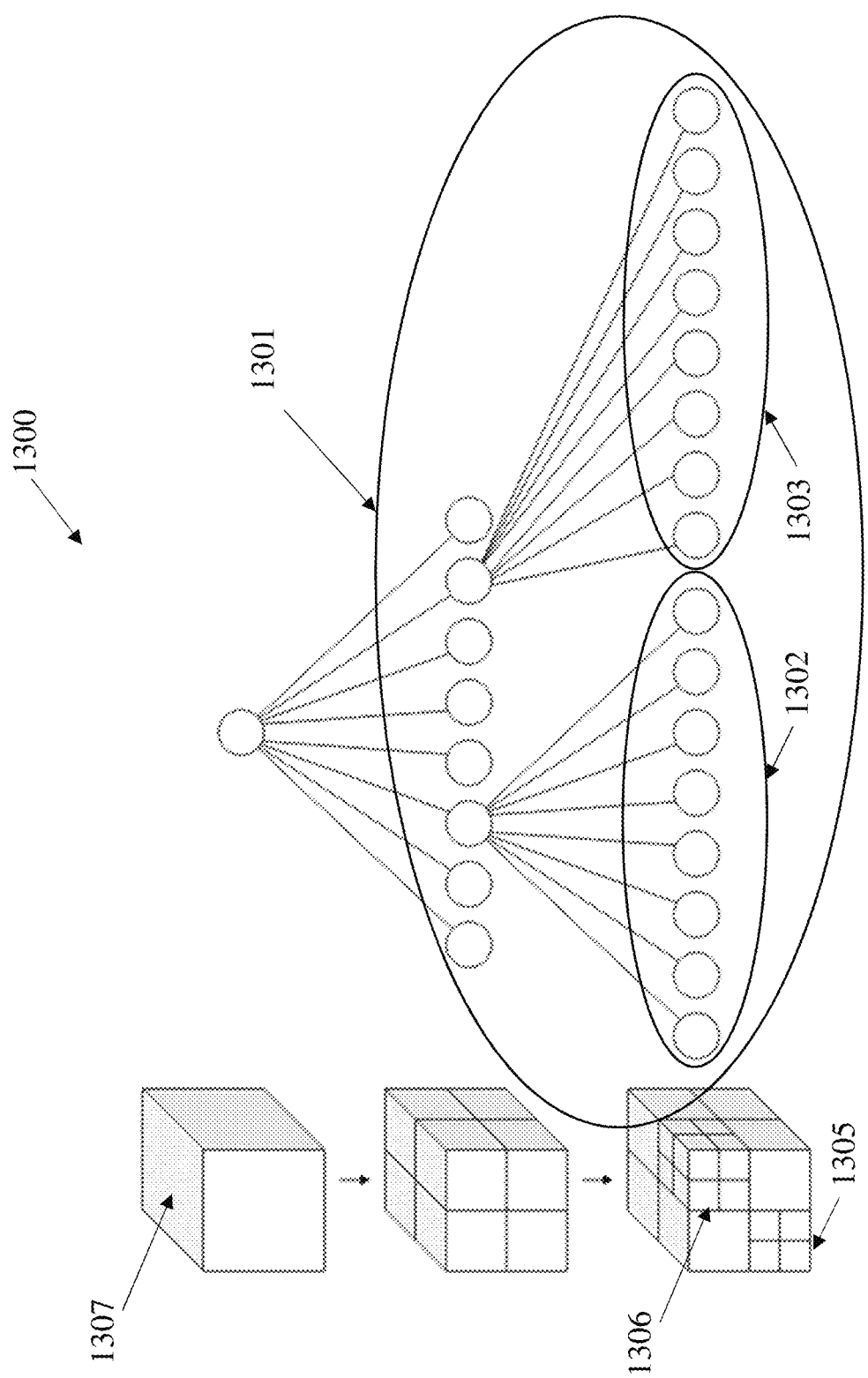
FIG. 13 is an exemplary diagram showing three '3dcc' track groups of sub-volumetric tracks based on the exemplary octree-based division for 3D sub-volumetric decomposition shown in FIG. 6, according to some embodiments.
Figure 14:
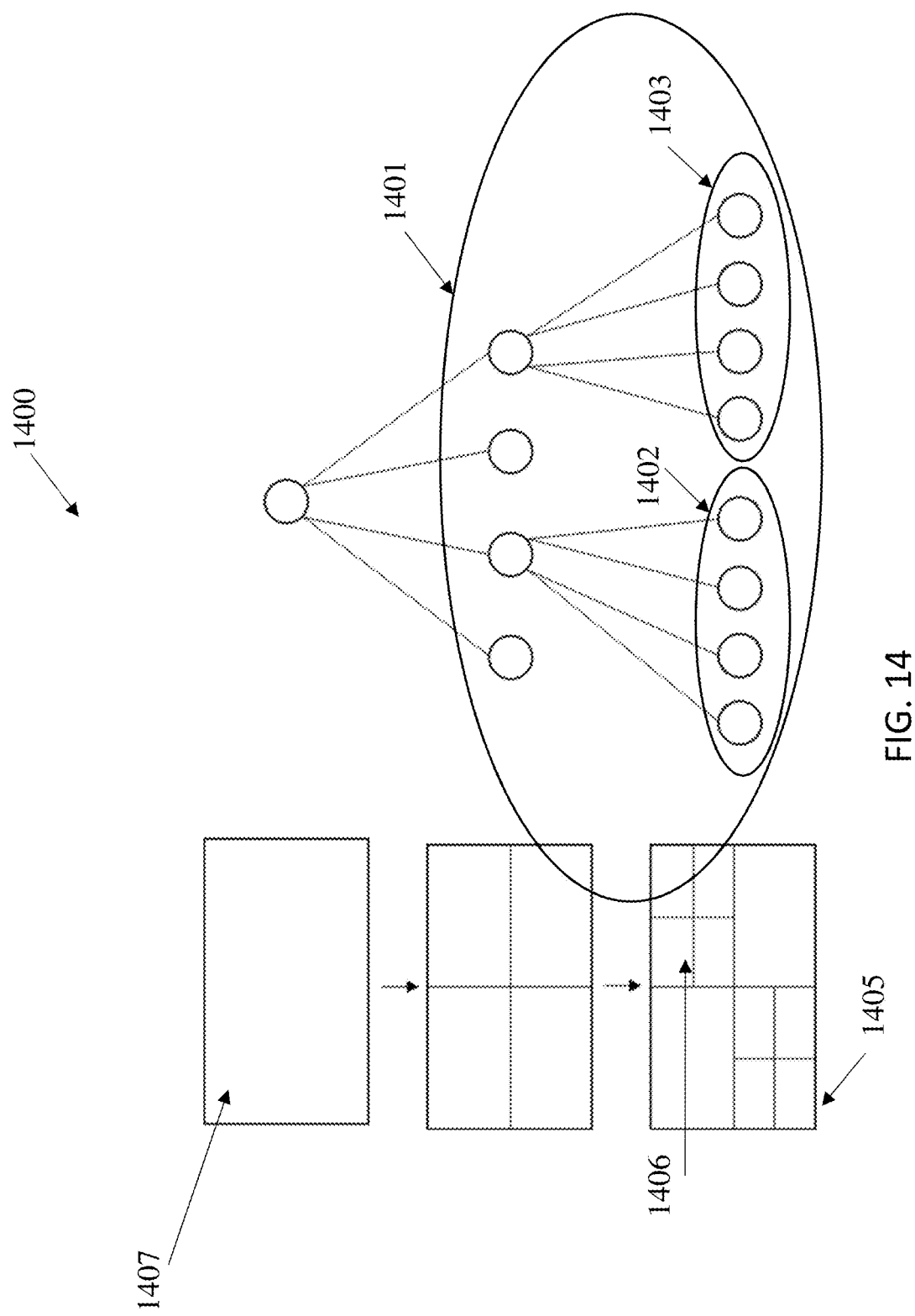
FIG. 14 is an exemplary diagram showing three '2dcc' track groups of sub-volumetric tracks based on the exemplary quadtree-based division for 2D sub-picture decomposition shown in FIG. 7, according to some embodiments

FIG. 13 is an exemplary diagram showing three '3dcc' track groups of sub-volumetric (leaf-node) tracks based on the exemplary octree-based division for 3D sub-volumetric decomposition shown in FIG. 6, according to some embodiments. Referring to FIG. 13, for example, the three '3dcc' track groups include 1301, containing both non-leaf composite tracks and leaf tracks, and track groups 1302 and 1303, both containing leaf tracks. Tracks within a group can be seen as belonging to a part of the same spatial portion. For example, the tracks in group 1302 each provide an associated portion of the spatial portion 1305, and the tracks in group 1303 each provide an associated portion of the spatial portion 1306. Track groups may comprise one or more other groups, for example as shown in FIG. 13 and FIG. 14 (e.g. group 1302 and 1303 are contained in 1301 in FIG. 13, group 1402 and 1403 are contained in 1401 in FIG. 14). According to some embodiments, the '3dcc' track groups may comprise other groups such that if a first group (e.g. 1301) contains a second group (e.g. 1302, 1303), the spatial portion of immersive media content corresponding to the first group (e.g. 1301) contains the spatial portion of immersive media content corresponding to the second group (e.g. 1302, 1303). The spatial portion of immersive media content corresponding to the patch track belonging to the second group (e.g. 1302, 1303) may therefore be of lesser volume than the spatial portion of immersive media content corresponding to the patch track of the first group (e.g. 1301). For example, the leaf tracks of 1302 and 1303, which each specify smaller spatial portions 1305 and 1306, respectively, specify spatial portions of the larger the spatial portion 1307 specified by track group 1301.

FIG. 14 is an exemplary diagram showing three '2dcc' track groups of sub-volumetric (leaf-node) tracks based on the exemplary quadtree-based division for 2D sub-picture decomposition shown in FIG. 7, according to some embodiments. For example, FIG. 14 shows three '2dcc' track groups including 1401, containing non-leaf composite tracks and leaf tracks, and including track groups 1402 and 1403, both containing leaf tracks. Tracks within the same group can be seen as belonging to a part of the same spatial portion. For example, the tracks in group 1402 each provide an associated portion of the spatial portion 1405, and the tracks in group 1403 each provide an associated portion of the spatial portion 1406. According to some embodiments, the '2dcc' track groups may comprise other groups such that if a first group (e.g. 1401) contains a second group (e.g. 1402, 1403), the spatial portion of immersive media content corresponding to the first group (e.g. 1401) contains the spatial portion of immersive media content corresponding to the second group (e.g. 1402, 1403). The spatial portion of immersive media content corresponding to the patch track belonging to the second group (e.g. 1402, 1403) may therefore be of lesser size than the spatial portion of immersive media content corresponding to the patch track of the first group (e.g. 1401). For example, the leaf tracks of 1402 and 1403, which each specify smaller spatial portions 1405 and 1406, respectively, specify spatial portions of the larger the spatial portion 1407 specified by track group 1401. With the 3D and 2D track grouping mechanisms, the example (leaf node) sub-volumetric tracks, 1300 and 1400, in the octree decomposition and sub-picture tracks in the quadtree decomposition can be illustratively grouped into multiple (3 in each of the examples) '3dcc' and '2dcc' track groups, as can be seen in illustrative FIG. 13 and FIG. 14. According to some embodiments, when point cloud media content is stored according to the techniques described herein (e.g., when V-PCC media content is stored in the patch track based ISOBMFF container described herein). In some embodiments, when point cloud media is tiled using the methods discussed below, spatial grouping of V-PCC tiles can be realized by the spatial grouping of the corresponding tile patch tracks, that is, by placing the corresponding 2D/3D grouping boxes of type '2dcc' and '3dcc' within the tile patch tracks.

In some embodiments, the techniques relate to patch-level partitioning. For example, V-PCC tiling can be done using patch-level partitioning techniques described herein. For example, multiple tile patch tracks can be created within a single container, whereas the other component tracks may remain intact, as described herein. The spatial relationship of these tile patch tracks, which can be at multiple levels depending on the number of levels of tiling (or sub-division), can be signaled by their containing 2D/3D grouping boxes (e.g., of type '2dcc' and type '3dcc').

In some embodiments, the techniques relate to 3D grid division. For example, V-PCC tiling can be done using the 3D grid division techniques described herein. For example, each 3D tile can be considered at the Systems level as valid V-PCC media content by itself, and therefore may be encapsulated in a single ISOBMFF container. Hence, the techniques can result in multiple containers of a patch track together with the other component tracks. The spatial relationship of these tile patch tracks may be in their containers, which can be at multiple levels depending on the number of levels of tiling or sub-division, can be signaled by their containing 2D/3D grouping boxes (e.g., of type '2dcc' and type '3dcc').

A V-PCC tile may be a 3D bounding box, a 2D bounding box, one or more Independent coding unit(s) (ICUs), and/or an equivalent structure, where some embodiments of these structures are discussed herein. As described herein, point cloud content within a V-PCC Tile may correspond to a V-PCC bit-stream or one of potentially multiple patch data groups (e.g. as described in V-PCC Systems Adhoc meeting held on Jun. 13-14, 2019). This is demonstrated in FIG. 8, for example, which illustrates an example of V-PCC Bit-stream Structure.

According to some embodiments, a point-cloud can be sub-divided into multiple sub-point-clouds (or V-PCC tiles in the CE 2.19) for the purposes of partial delivery and access (e.g. as described in m48109, "Signaling of 2D and 3D Spatial Relationship of V-PCC Tiles for their Partial Access and Delivery," Gothenburg, SE. (July 2019) and N18414, "Technologies Under Consideration for Carriage of Point Cloud Data," Geneva, CH. (March 2019), which are hereby incorporated by reference herein in their entirety). In some embodiments, the sub-point-clouds can be signaled and encapsulated at either the V-PCC bit-stream level or the patch data group level. The sub-point-clouds can be signaled in various ways. In some embodiments, sub-point-clouds may be signaled at the V-PCC bit-stream and/or patch data group levels, in order to encapsulate V-PCC content of sub-point-clouds, respectively, in multiple groups of ISOBMFF tracks. In some embodiments, each group may correspond to a V-PCC bit-stream, and in the case of multiple ISOBMFF tracks, each group may correspond to a patch data group within a same V-PCC bit-stream.

In some embodiments, signaling 6DoF coordinates of a sub-point-cloud (e.g. for a V-PCC Tile) may occur in V-PCC bit-streams (e.g. as described in N18479). According to the techniques described herein, a sub-point-cloud 6DoF coordinate set may be added into V-PCC bit-stream SPS and PSPS syntax. For example, a sub-point-cloud 6DoF coordinate set may be added as provided in N18479, in the form general_sequence_parameter_set( ) (e.g. as described in Clause 7.3.4.1 of N18479), patch_sequence_parameter_set( )) (e.g. as described in Clause 7.3.5.3 of N18479).

In some embodiments, the sub-point-cloud can be signaled in the geometry related data set. In some embodiments, the geometry related syntax can be added at the bit-stream level (e.g., as described in Clause 7.3.4.4 of N18479) and/or patch data group level (e.g., as described in Clauses 7.3.5.4 and 7.3.5.5 of N18479). In the case that sub-point-clouds are signaled at the both levels of a V-PCC bit-stream and its patch data groups, those at the patch data group level can be considered as sub-point-clouds of those at the bit-stream level.

Figure 15:
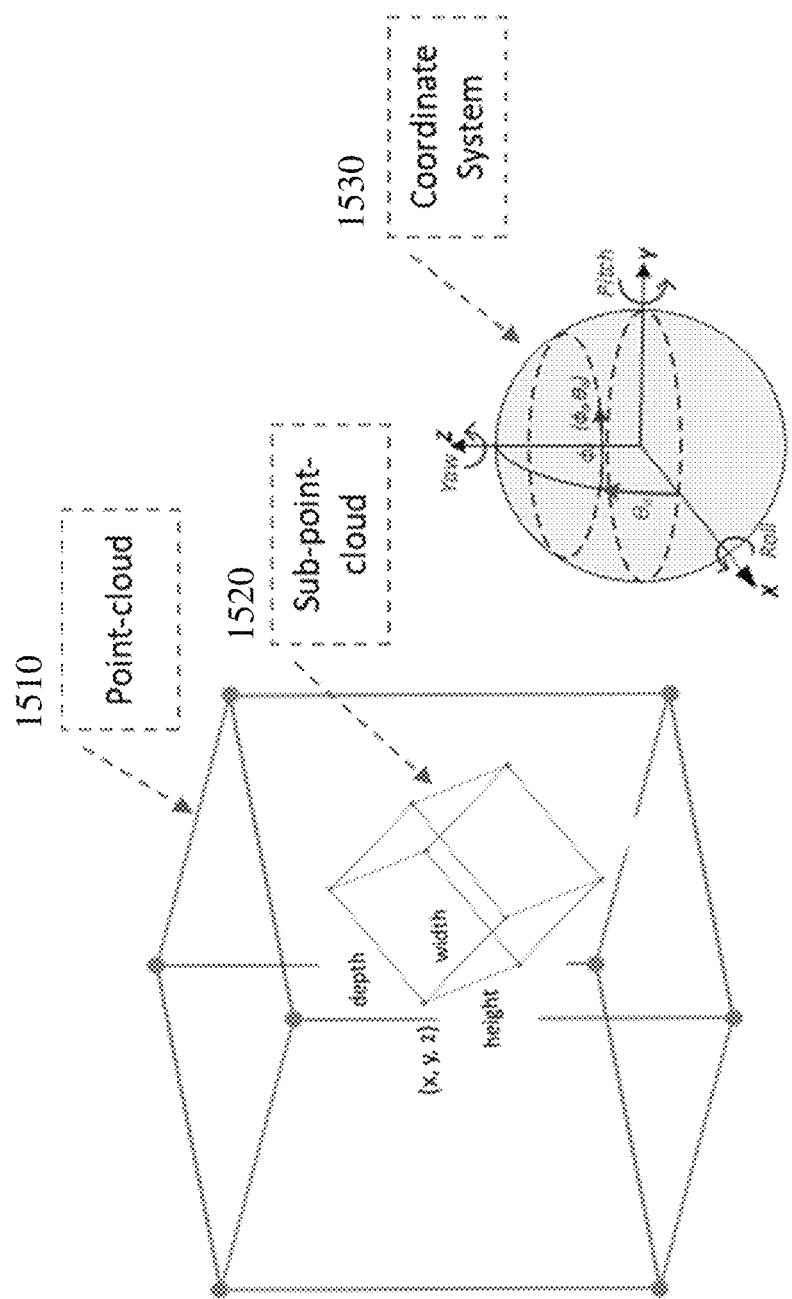
FIG. 15 is an exemplary diagram showing a sub-point-cloud, according to some embodiments.

FIG. 15 is an exemplary diagram showing a sub-point-cloud, according to some embodiments. A sub-point-cloud 1520 can be considered as enclosed by a 3D bounding box, which may have a position (e.g. (x, y, z)), a size (e.g. (width, height, depth)), and may be rotated (e.g. in (yaw, pitch, roll)), with respect to a common reference 6DoF coordinate system, such as the one shown in 1503, used by a point-cloud 1510.

FIG. 16 shows exemplary syntax of a V-PCC sub-point-cloud 6DoF coordinate 1600, according to some embodiments. The syntax contains fields indicating data associated with the position, size and rotation as described herein. It should be appreciated that while FIG. 16 shows an exemplary syntax, this is for illustrative purposes and is not intended to be limiting. Various other fields, naming conventions, and/or the like can be used without departing from the techniques described herein.

The spc_position_x field 1601 can specify the x-coordinate position of the vertex of the 3D bounding box of the sub-point-cloud with the minimum x-coordinate value among all the 8 vertices of the bounding box. The spc_position_y field 1602 can be used to specify the y-coordinate position of the vertex of the 3D bounding box of the sub-point-cloud with the minimum y-coordinate value among all the 8 vertices of the bounding box. The spc_position_z field 1603 can be used to specify the z-coordinate position of the vertex of the 3D bounding box of the sub-point-cloud with the minimum z-coordinate value among all the 8 vertices of the bounding box. The spc_rotation_yaw field 1604 can be used to specify the yaw rotation angle of the 3D bounding box of the sub-point-cloud along the z-coordinate axis. The spc_rotation_pitch-field 1604 can be used to specify the pitch rotation angle of the 3D bounding box of the sub-point-cloud along the y-coordinate axis. The spc_rotation_roll field 1605 can be used to specify the roll rotation angle of the 3D bounding box of the sub-point-cloud along the x-coordinate axis. The spc_size_width field 1606 can be used to specify the size length of the 3D bounding box of the sub-point-cloud along the x-coordinate axis. The spc_size_height field 1607 can be used to specify the size length of the 3D bounding box of the sub-point-cloud along the y-coordinate axis. The spc_size_depth field 1608 can be used to specify the size length of the 3D bounding box of the sub-point-cloud along the z-coordinate axis.

Figure 17:
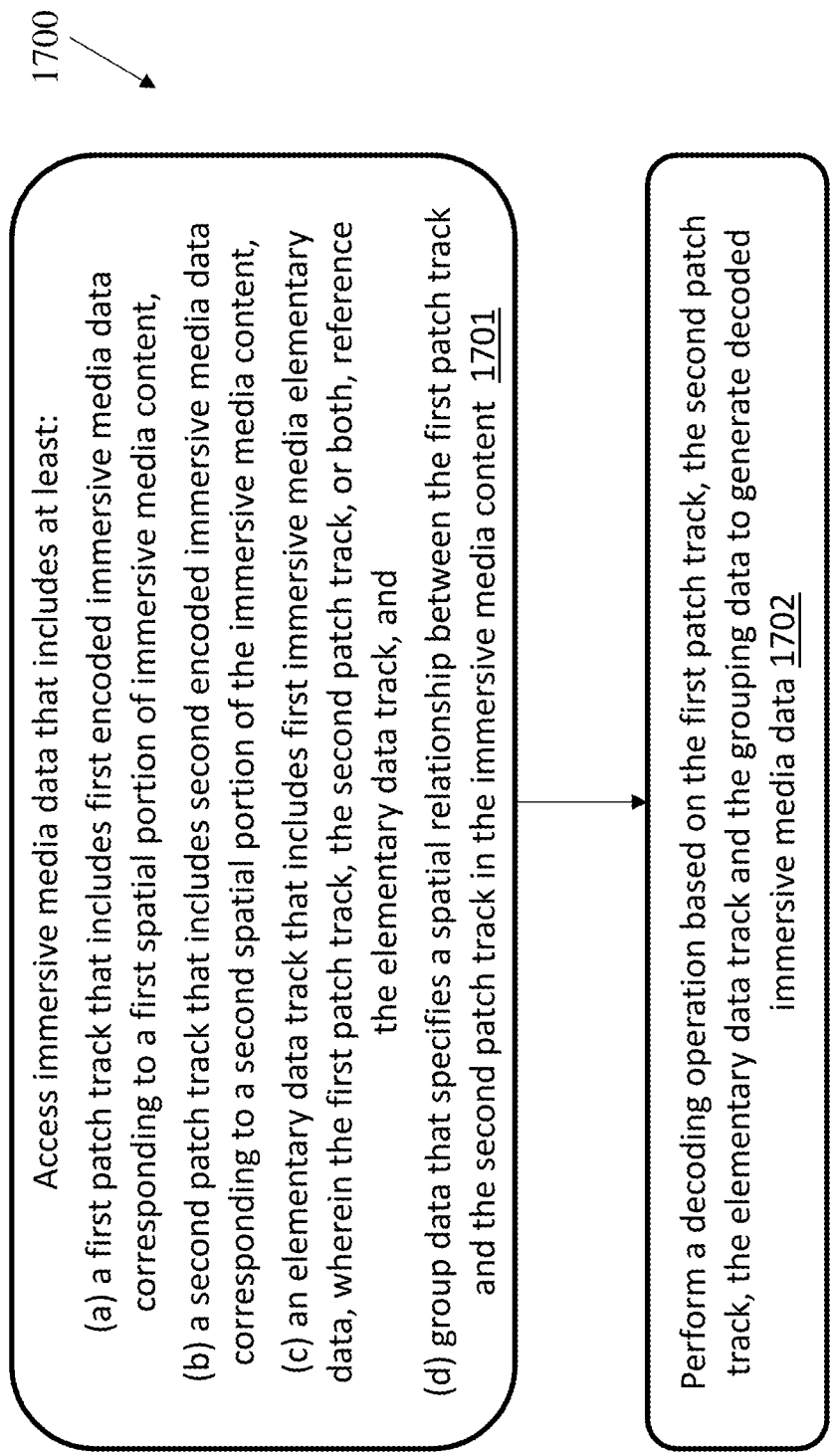
FIG. 17 shows an exemplary method for decoding video data for immersive data, according to some embodiments.

FIG. 17 shows an exemplary method 1700 for decoding video data for immersive data, according to some embodiments. The method comprises accessing and/or receiving immersive media data at step 1701 that includes a plurality of patch tracks, including (a) at least a first patch track that includes encoded immersive media data that corresponds to a first spatial portion of immersive media content, and (b) a second patch track that includes encoded immersive media data corresponding to a second spatial portion of the immersive media content. The immersive media data also includes (c) an elementary data track that includes immersive media elementary data. As described herein, for example, the elementary data track can be a parameter track, geometry track, texture track, and/or occupancy track. The first patch track, the second patch track, or both, reference the elementary data track. The immersive media data also includes (d) group data that specifies a spatial relationship between the first patch track and the second patch track in the immersive media content.

At step 1702, the method includes performing a decoding operation based on the first patch track, the second patch track, the elementary data track and the grouping data to generate decoded immersive media data. The immersive media content can be point cloud multimedia.

According to some embodiments, a patch track, (e.g. the first and second patch track of FIG. 17), contains an associated portion of grouping data that indicates that the patch group is part of one or more groups of patch tracks. When there is more than one group, a group can in some cases include one or more other groups, for example as shown in FIG. 13 and FIG. 14 (e.g. group 1302 and 1303 are contained in 1301 in FIG. 13, group 1402 and 1403 are contained in 1401 in FIG. 14). When there is more than one group, such that a first group contains a second group, the spatial portion of immersive media content corresponding to the first group contains the spatial portion of immersive media content corresponding to the second group.

Accessing the immersive media data as in step 1701 of exemplary method 1700 includes accessing the geometry data in one or more geometry tracks, the attribute data in one or more attribute tracks, and/or the occupancy map data of the occupancy track. Performing the immersive media track derivation operation in 1702 includes performing the immersive media track derivation operation on the geometry data, the attribute data, and the occupancy map data, to generate the decoded immersive media data.

The immersive media data can be encoded two-dimensional (2D) data and/or encoded three-dimensional (3D) data. As described herein (e.g., in conjunction with FIG. 16), the immersive media data may include data that specifies the spatial orientation of encoded three-dimensional (3D) sub-volumetric data. For example, the data may specify a position (e.g. (x, y, z) coordinates) of the encoded three-dimensional (3D) sub-volumetric data and/or a size described by a width, height and depth of the encoded three-dimensional (3D) sub-volumetric data. In some embodiments, the data further comprises a rotation (e.g. (yaw, pitch, roll)) of the encoded three-dimensional (3D) sub-volumetric data with respect to a common reference coordinate system.

Figure 18:
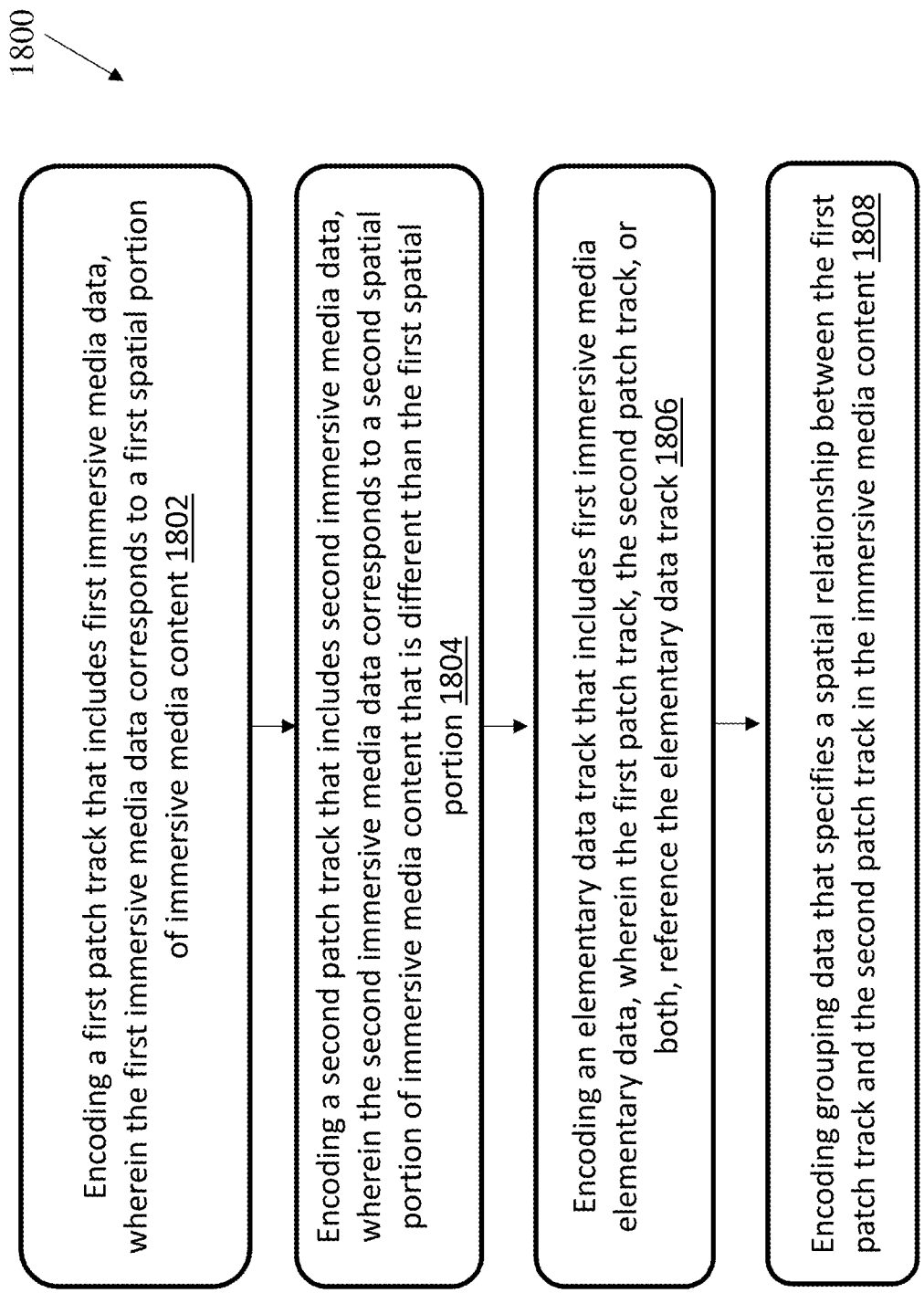
FIG. 18 shows an exemplary method for encoding video data for immersive data, according to some embodiments.

As discussed herein, the techniques can be similarly used to encode video content. For example, FIG. 18 shows an exemplary method 1800 for encoding video data for immersive data, according to some embodiments. The method includes step 1802 in which a first patch track is encoded, and step 1804 in which a second patch track is encoded, where the first and second patch track each include immersive media data that corresponds to a first and second spatial portion of immersive media content respectively and step 1806 corresponding to encoding an elementary data track that includes immersive media elementary data. The first patch track, the second patch track, or both, reference the elementary data track. The method further includes step 1808, in which grouping data is encoded.

Various exemplary syntaxes and use cases are described herein, which are intended for illustrative purposes and not intended to be limiting. It should be appreciated that only a subset of these exemplary fields may be used for a particular region and/or other fields may be used, and the fields need not include the field names used for purposes of description herein. For example, the syntax may omit some fields and/or may not populate some fields (e.g., or populate such fields with a null value). As another example, other syntaxes and/or classes can be used without departing from the spirit of the techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data for immersive media, the method comprising:
    accessing immersive media data comprising at least:
        a first patch track comprising first encoded immersive media data, wherein:
            the first encoded immersive media data corresponds to a first spatial portion of immersive media content; and
            the first patch track comprises a first associated portion of grouping data indicating the first patch track is part of one or more groups of patch tracks;
        a second patch track comprising second encoded immersive media data, wherein:
            the second encoded immersive media data corresponds to a second spatial portion of the immersive media content that is different than the first spatial portion; and
            the second patch track comprises a second associated portion of the grouping data indicating the second patch track is part of the one or more groups of patch tracks,
        wherein the one or more groups of patch tracks comprises a plurality of groups of patch tracks, comprising at least:
            a first group of patch tracks corresponding to a third spatial portion of immersive media content that includes the first spatial portion of immersive media content of the first patch track and the second spatial portion of immersive media content of the second patch track; and
            a second group of patch tracks corresponding to a fourth spatial portion of immersive media content, wherein the third spatial portion of immersive media content contains the fourth spatial portion of immersive media content;
        an elementary data track comprising first immersive media elementary data, wherein the first patch track, the second patch track, or both, reference the elementary data track; and
        grouping data that specifies a spatial relationship between the first patch track and the second patch track in the immersive media content; and
    performing a decoding operation based on the first patch track, the second patch track, the elementary data track and the grouping data to generate decoded immersive media data.

2. The method of claim 1, wherein the first group of patch tracks contains the second group of patch tracks.

3. The method of claim 1, wherein the immersive media content comprises point cloud multimedia.

4. The method of claim 1, wherein the elementary data track comprises:
    at least one geometry track comprising geometry data of the immersive media;
    at least one attribute track comprising attribute data of the immersive media; and
    an occupancy track comprising occupancy map data of the immersive media;
    accessing the immersive media data comprises accessing:
        the geometry data in the at least one geometry track;
        the attribute data in the at least one attribute track; and
        the occupancy map data of the occupancy track; and
    performing the decoding operation comprises performing the decoding operation using the geometry data, the attribute data, and the occupancy map data, to generate the decoded immersive media data.

5. The method of claim 1, wherein the first encoded immersive media data and the second encoded immersive media data comprise encoded two-dimensional (2D) data.

6. The method of claim 1, wherein the first encoded immersive media data and the second encoded immersive media data comprise encoded three-dimensional (3D) data.

7. The method of claim 6, wherein the immersive media data further comprises data that specifies a spatial orientation of the encoded 3D data, the data comprising:
   a position comprising x, y, z coordinates for the encoded 3D data;
   a width of the encoded 3D data;
   a height of the encoded 3D data; and
   a depth of the encoded 3D data.

8. The method of claim 7, wherein the data specifying the spatial orientation of the encoded 3D data further comprises rotation data indicative of a rotation of the encoded 3D data with respect to a common reference coordinate system.

9. The method of claim 8, wherein the rotation data comprises data indicative of a yaw, a pitch and a roll.

10. A method for encoding video data for immersive media, the method comprising:
   encoding immersive media data, comprising encoding at least:
      a first patch track comprising first immersive media data, wherein:
         the first immersive media data corresponds to a first spatial portion of immersive media content; and
         the first patch track comprises a first associated portion of grouping data indicating the first patch track is part of one or more groups of patch tracks;
      a second patch track comprising second immersive media data, wherein:
         the second immersive media data corresponds to a second spatial portion of immersive media content that is different than the first spatial portion; and
         the second patch track comprises a second associated portion of the grouping data indicating the second patch track is part of the one or more groups of patch tracks,
      wherein the one or more groups of patch tracks comprises a plurality of groups of patch tracks, comprising at least:
         a first group of patch tracks corresponding to a third spatial portion of immersive media content that includes the first spatial portion of immersive media content of the first patch track and the second spatial portion of immersive media content of the second patch track; and
         a second group of patch tracks corresponding to a fourth spatial portion of immersive media content, wherein the third spatial portion of immersive media content contains the fourth spatial portion of immersive media content;
      an elementary data track comprising first immersive media elementary data, wherein the first patch track, the second patch track, or both, reference the elementary data track; and
      grouping data that specifies a spatial relationship between the first patch track and the second patch track in the immersive media content.

11. An apparatus configured to decode video data, the apparatus comprising a processor in communication with memory, the processor being configured to execute instructions stored in the memory that cause the processor to perform:
   accessing immersive media data comprising at least:
      a first patch track comprising first encoded immersive media data, wherein:
         the first encoded immersive media data corresponds to a first spatial portion of immersive media content; and
         the first patch track comprises a first associated portion of grouping data indicating the first patch track is part of one or more groups of patch tracks;
      a second patch track comprising second encoded immersive media data, wherein:
         the second encoded immersive media data corresponds to a second spatial portion of the immersive media content that is different than the first spatial portion; and
         the second patch track comprises a second associated portion of the grouping data indicating the second patch track is part of the one or more groups of patch tracks,
      wherein the one or more groups of patch tracks comprises a plurality of groups of patch tracks, comprising at least:
         a first group of patch tracks corresponding to a third spatial portion of immersive media content that includes the first spatial portion of immersive media content of the first patch track and the second spatial portion of immersive media content of the second patch track; and
         a second group of patch tracks corresponding to a fourth spatial portion of immersive media content, wherein the third spatial portion of immersive media content contains the fourth spatial portion of immersive media content;
      an elementary data track comprising first immersive media elementary data, wherein the first patch track, the second patch track, or both, reference the elementary data track; and
      grouping data that specifies a spatial relationship between the first patch track and the second patch track in the immersive media content; and
   performing a decoding operation based on the first patch track, the second patch track, the elementary data track and the grouping data to generate decoded immersive media data.

12. The apparatus of claim 11, wherein the first group of patch tracks contains the second group of patch tracks.

13. The apparatus of claim 11, wherein the immersive media content comprises point cloud multimedia.

14. The apparatus of claim 11, wherein the elementary data track comprises:
   at least one geometry track comprising geometry data of the immersive media content;
   at least one attribute track comprising attribute data of the immersive media content; and
   an occupancy track comprising occupancy map data of the immersive media content;
   accessing the immersive media data comprises accessing:
      the geometry data in the at least one geometry track;
      the attribute data in the at least one attribute track; and
      the occupancy map data of the occupancy track; and
   performing the decoding operation comprises performing the decoding operation using the geometry data, the attribute data, and the occupancy map data, to generate the decoded immersive media data.

15. The apparatus of claim 11, wherein the first encoded immersive media data and the second encoded immersive media data comprise encoded three-dimensional (3D) data.

16. The apparatus of claim 15, wherein the immersive media data further comprises data that specifies a spatial orientation of the encoded 3D data, the data comprising:
- a position comprising x, y, z coordinates for the encoded 3D data;
- a width of the encoded 3D data;
- a height of the encoded 3D data; and
- a depth of the encoded 3D data.

17. The apparatus of claim 16, wherein the data specifying the spatial orientation of the encoded 3D data further comprises rotation data indicative of a rotation of the encoded 3D data with respect to a common reference coordinate system.

18. The apparatus of claim 17, wherein the rotation data comprises data indicative of a yaw, a pitch and a roll.

* * * * *